United States Patent
Sugita et al.

(10) Patent No.: US 9,779,699 B2
(45) Date of Patent: Oct. 3, 2017

(54) IMAGE PROCESSING DEVICE, IMAGE PROCESSING METHOD, COMPUTER READABLE MEDIUM

(71) Applicant: KABUSHIKI KAISHA TOSHIBA, Tokyo (JP)

(72) Inventors: Kaoru Sugita, Saitama (JP); Masahiro Sekine, Tokyo (JP); Masashi Nishiyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 364 days.

(21) Appl. No.: 13/933,282

(22) Filed: Jul. 2, 2013

(65) Prior Publication Data
US 2014/0085330 A1  Mar. 27, 2014

(30) Foreign Application Priority Data
Sep. 27, 2012 (JP) ................... 2012-214991

(51) Int. Cl.
*G09G 5/00* (2006.01)
*G09G 5/377* (2006.01)
(Continued)

(52) U.S. Cl.
CPC ............ *G09G 5/377* (2013.01); *G06F 3/017* (2013.01); *G06F 3/147* (2013.01); *G06T 19/006* (2013.01);
(Continued)

(58) Field of Classification Search
CPC ............... G09G 5/14; G09G 2340/10; G09G 2340/125; G09G 5/377; G06T 11/60; G06T 15/503
(Continued)

(56) References Cited

U.S. PATENT DOCUMENTS 7,657,341 B2 * 2/2010 Lind ............................. 700/141
8,976,230 B1 * 3/2015 Vendrow ....................... 348/46
(Continued)

FOREIGN PATENT DOCUMENTS

| JP | 2005-256232 | 9/2007 |
| JP | 2010-152557 | 7/2010 |
| JP | 2012-118948 | 6/2012 |

OTHER PUBLICATIONS

Office Action dated Jun. 16, 2015 in counterpart Japanese Patent Application No. 2014-182382 and English-language translation thereof.

*Primary Examiner* — Frank Chen
(74) *Attorney, Agent, or Firm* — Nixon & Vanderhye P.C.

(57) ABSTRACT

According to an embodiment, an image processing device includes a first calculator to calculate, when a photographic subject image is determined to satisfy a first condition, a first position of the clothing image such that the position of a feature area matches with the position of the feature area; a second calculator to calculate a second position of the clothing image in the photographic subject image such that the position of a feature point in the clothing image matches with the position of the feature point in the photographic subject image; a deciding unit to decide, when the photographic subject image is determined to satisfy the first condition, on the first position as a superimposition position, and decide, when the photographic subject image is determined not to satisfy the first condition, on the superimposition position based on the difference between the first position and the second position.

20 Claims, 13 Drawing Sheets

(51) Int. Cl.
  *G06F 3/147*   (2006.01)
  *G06F 3/01*    (2006.01)
  *G06T 19/00*   (2011.01)

(52) U.S. Cl.
  CPC ...... *G06T 2210/16* (2013.01); *G09G 2340/10* (2013.01); *G09G 2340/12* (2013.01)

(58) Field of Classification Search
  USPC ........................................................ 345/629
  See application file for complete search history.

(56) References Cited

U.S. PATENT DOCUMENTS

| | | | |
|---|---|---|---|
| 2001/0026272 A1* | 10/2001 | Feld et al. | 345/419 |
| 2006/0202986 A1* | 9/2006 | Okada et al. | 345/419 |
| 2008/0183440 A1* | 7/2008 | Lind | 703/1 |
| 2011/0279475 A1 | 11/2011 | Ikenoue | |
| 2013/0033591 A1 | 2/2013 | Takahashi et al. | |
| 2013/0113829 A1* | 5/2013 | Suzuki | G09G 5/00 345/633 |
| 2013/0113830 A1* | 5/2013 | Suzuki | G06T 3/00 345/634 |

* cited by examiner

| CLOTHING NUMBER | POSTURE INFORMATION | CLOTHING IMAGE | ATTRIBUTE INFORMATION |
|---|---|---|---|
|  |  |  |  |
|  |  |  |  |

IMAGE PROCESSING DEVICE, IMAGE PROCESSING METHOD, COMPUTER READABLE MEDIUM

CROSS-REFERENCE TO RELATED APPLICATIONS

This application is based upon and claims the benefit of priority from Japanese Patent Application No. 2012-214991, filed on Sep. 27, 2012; the entire contents of which are incorporated herein by reference.

FIELD

Embodiments described herein relate generally to an image processing device, an image processing method, and a computer readable medium.

BACKGROUND

Various technologies have been disclosed regarding displaying virtual images of a condition of wearing target clothing for trial fitting. For example, a technology is disclosed for displaying synthetic images of a condition of doing trial fitting of a plurality of articles of clothing on a human body. Moreover, a technology is disclosed in which an object captured in an obtained image is detected by performing template matching with the use of an already-prepared reference image, and a virtual image is superimposed on the detected object.

However, in the technology in which template matching is performed, although it is possible to achieve accuracy improvement, the processing load is also high. Hence, it is difficult to provide synthetic images at a low processing load while achieving accuracy improvement at the same time.

DETAILED DESCRIPTION

According to an embodiment, an image processing device includes a first obtaining unit, a second obtaining unit, a determining unit, a first calculator, a second calculator, a deciding unit, and a generating unit. The first obtaining unit is configured to obtain a photographic subject image. The second obtaining unit is configured to obtain a clothing image that is to be superimposed. The determining unit is configured to determine whether or not the photographic subject image satisfies a predetermined first condition. The first calculator is configured to, when the photographic subject image is determined to satisfy the first condition, calculate a first position of the clothing image in the photographic subject image in such a way that a position of a feature area, which enables estimation of a shape of the photographic subject captured in the photographic subject image, matches with the position of the feature area in the clothing image. The second calculator is configured to calculate a second position of the clothing image in the photographic subject image in such a way that the position of a feature point, which is set in advance according to the feature area in the photographic subject image, matches with the position of the feature point in the clothing image. The deciding unit is configured to, when the photographic subject image is determined to satisfy the first condition, decide on the first position as a superimposition position in the photographic subject image at which the clothing image is to be superimposed, and configured to, when the photographic subject image is determined not to satisfy the first condition, decide on the superimposition position on the basis of a difference between the first position calculated from a first photographic subject image, which is a photographic subject image obtained previous to the photographic subject image, and the second position calculated by the second calculator from the first photographic subject image. The generating unit is configured to generate a synthetic image by superimposing the clothing image at the superimposition position in the photographic subject image.

Various embodiments will be described below in detail with reference to the accompanying drawings.

First Embodiment

Figure 1:
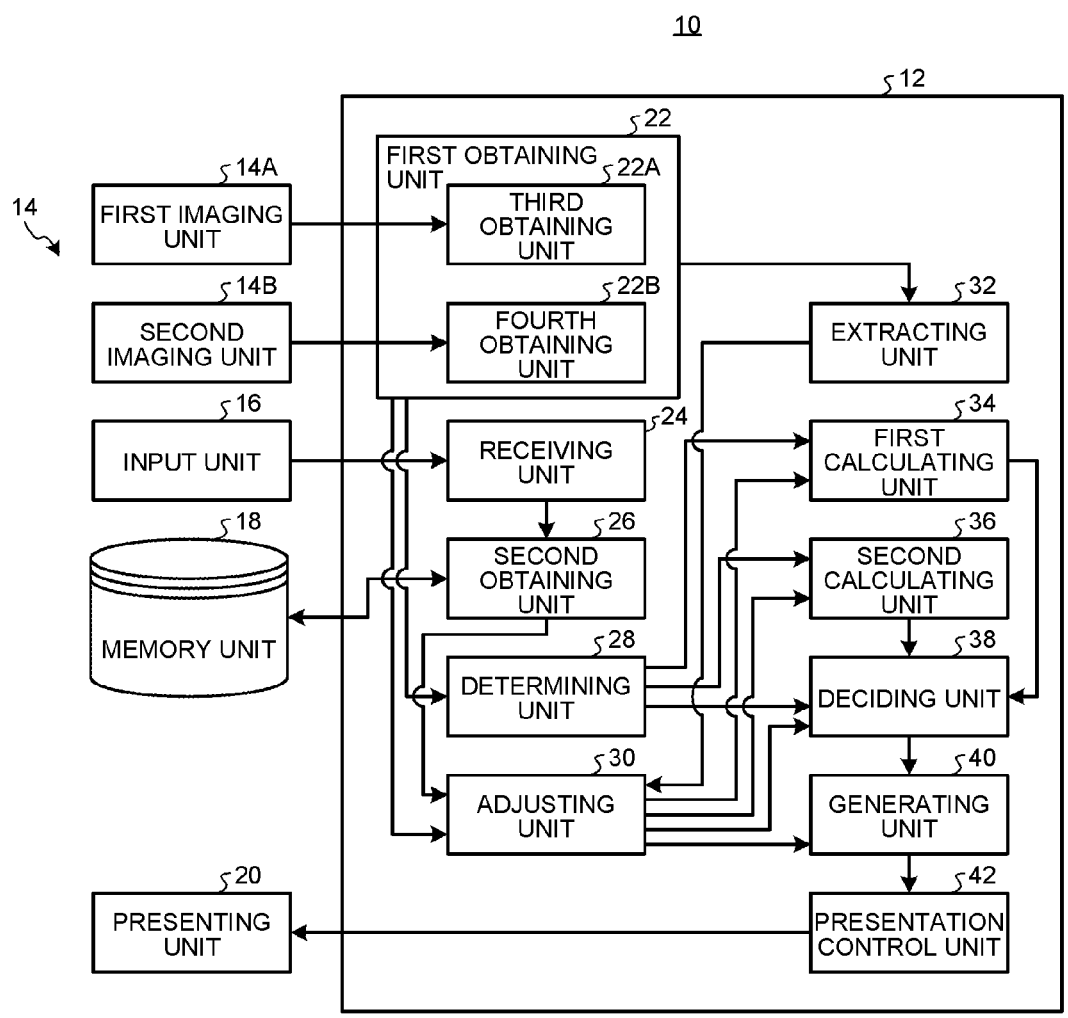
FIG. 1 is a block diagram of an image processing system according to a first embodiment.

FIG. 1 is a block diagram illustrating a functional configuration of an image processing system 10 according to a first embodiment. The image processing system 10 includes an image processing device 12, an imaging unit 14, an input unit 16, a memory unit 18, and a presenting unit 20.

In the first embodiment, the explanation is given for a case in which the image processing system 10 includes the image processing device 12, the imaging unit 14, the input unit 16, the memory unit 18, and the presenting unit 20 as separate constituent elements. However, alternatively, the image processing system 10 can also include the image processing device 12 that is configured in an integrated manner with at least one of the imaging unit 14, the input unit 16, the memory unit 18, and the presenting unit 20.

The imaging unit 14 captures images of a photographic subject and obtains photographic subject images. The imaging unit 14 captures images of the photographic subject at predetermined time intervals. Then, the imaging unit 14 sequentially sends the photographic subject images, which are obtained by means of imaging, to the image processing device 12. Since the imaging unit 14 captures images of the photographic subject in succession and sequentially outputs the captured photographic subject images to the image processing device 12, it becomes possible for the image processing device 12 to obtain a dynamic image that contains a plurality of photographic subject images each captured at a different timing.

Herein, the photographic subject is the target on which trial fitting of clothing is to be done, and can either be a living object or a non-living material. An example of the living object is a human being. However, that is not the only possible case, and a pet animal such as a dog or a cat can also be taken into account. Examples of the non-living material include a dummy that is formed in the shape of a human being or a pet animal; an article of clothing; and some other object. However, that is not the only possible case. Meanwhile, as the photographic subject, it is also possible to capture images of a living object or a non-living material that is already wearing clothing.

Herein, clothing points to the articles that can be put on the photographic subject. Examples of an article of clothing include a coat, a skirt, pants, a pair of shoes, a hat, and the like.

In the first embodiment, the imaging unit 14 includes a first imaging unit 14A and a second imaging unit 14B.

The first imaging unit 14A obtains a depth image of the photographic subject by means of imaging. The second imaging unit 14B obtains a color image of the photographic subject by means of imaging.

A color image is a bitmap image. For each pixel in a color image of the photographic subject, a pixel value is defined that indicates the color of the photographic subject or the brightness of the photographic subject. Herein, the second imaging unit 14B is a known imaging device that is capable of obtaining color images.

A depth image is sometimes called a range image. In a depth image of the photographic subject, for each pixel constituting the photographic subject image, the distance from the first imaging unit 14A which captured that photographic subject is defined. In the first embodiment, a depth image of the photographic subject can be created from a color image of that photographic subject by implementing a known method such as stereo matching, or can be obtained by performing imaging using the first imaging unit 14A under the same imaging conditions as the imaging conditions used in capturing the color image. Herein, the first imaging unit 14A is a known imaging device that is capable of obtaining depth images.

In the first embodiment, the first imaging unit 14A and the second imaging unit 14B capture images of the photographic subject at the same timings. That is, it is assumed that, under the control of a control unit (not illustrated), the first imaging unit 14A and the second imaging unit 14B are controlled to sequentially capture images in synchronization at the same timings. Then, to the image processing device 12, the imaging unit 14 sequentially outputs the photographic subject images each containing a depth image of the photographic subject and a color image of the photographic subject that are obtained by means of imaging.

The presenting unit 20 is a device for presenting various images. In the first embodiment, the presenting unit 20 presents synthetic images (described later) that are generated by the image processing device 12. Moreover, in the first embodiment, presentation of images includes displaying, printing, and sending of the images.

The presenting unit 20 can be, for example, a display device such as a liquid crystal display (LCD) device, or a printing device that prints images, or a known communication device that sends information to an external device by means of wire communication or wireless communication. If the presenting unit 20 is a display device, then it displays synthetic images. If the presenting unit 20 is a communication device, then it sends synthetic images to an external device. If the presenting unit 20 is a printing device, then it prints synthetic images.

In the first embodiment, presentation of images points to displaying of images. Thus, the explanation is given under the assumption that the presenting unit 20 is a display device.

The input unit 16 is used by the user to perform various operation inputs. The input unit 16 can be configured, for example, by combining one or more of a mouse, buttons, a remote control, a keyboard, a voice recognition device such as a microphone, and an image recognition device. In the case of using an image recognition device in the input unit 16; the image recognition device can be configured to receive user gestures, which are performed by the user in front of the input unit 16, as various instructions from the user. In this case, in the image recognition device, instruction information corresponding to body motions or gestures can be stored in advance; and operation instructions from the user are received by reading the instruction information corresponding to the recognized gestures.

Meanwhile, alternatively, the input unit 16 can be a communication device that receives signals, which represent operation instructions from the user, from an external device such as a handheld device that sends a variety of information. In this case, as the operation instructions from the user, the input unit 16 can receive signals that represent operation instructions received from an external device.

It is also possible to configure the input unit 16 and the presenting unit 20 in an integrated manner. More particularly, the input unit 16 and the presenting unit 20 can be configured as a user interface (UI) that is equipped with an input function and a display function. An example of the UI is an LCD having a touch-sensitive panel.

Figure 2:
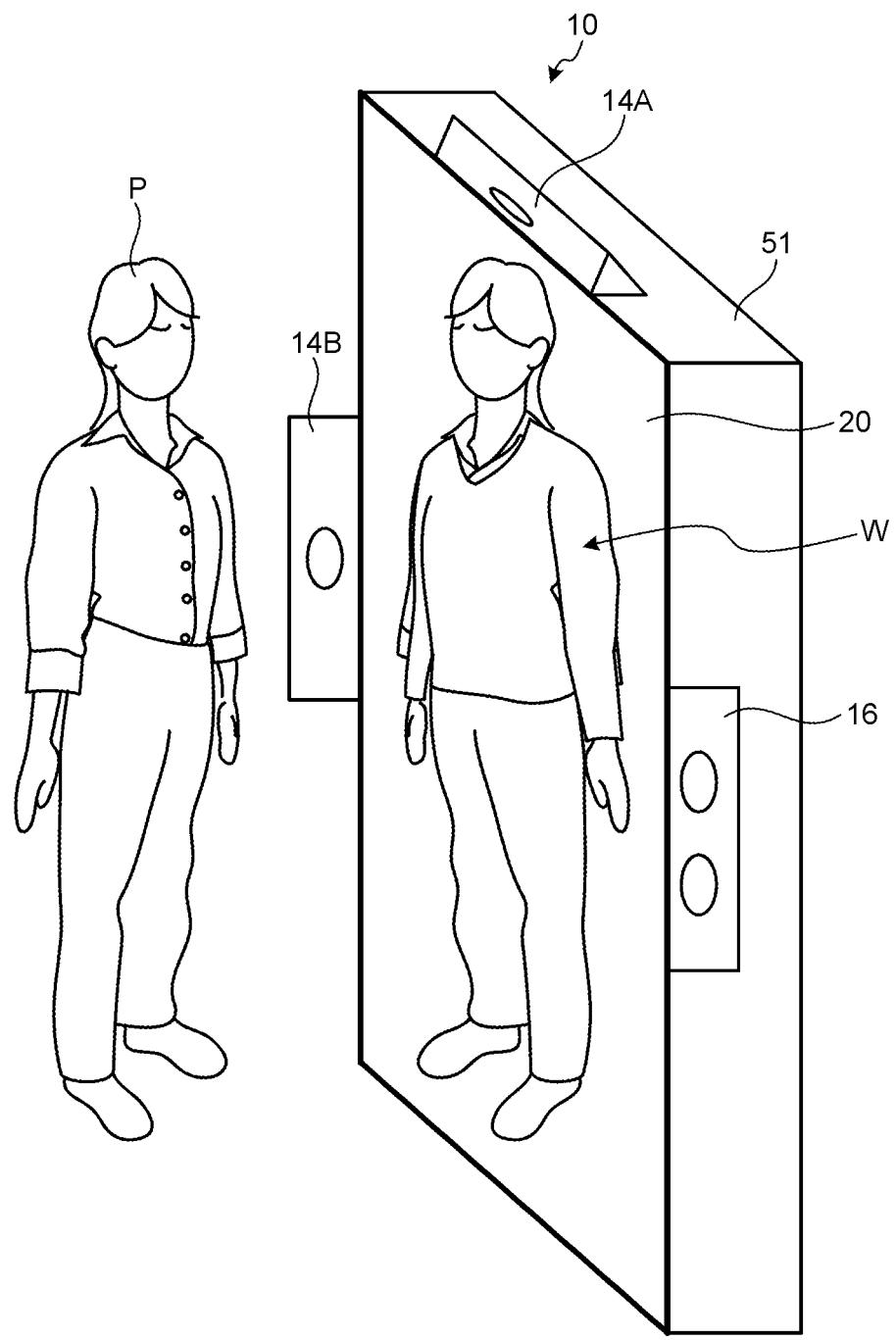
FIG. 2 is a schematic diagram illustrating an external appearance of the image processing system according to the first embodiment.

FIG. 2 is a schematic diagram illustrating an external appearance of the image processing system 10.

As illustrated in FIG. 2, in the image processing system 10, the presenting unit 20 is incorporated into one of the faces of a housing 51 that has, for example, a rectangular shape. In the image processing system 10, on the presenting unit 20 is displayed a synthetic image W of a condition in which trial fitting of a variety of clothing is done on a photographic subject P. The photographic subject P such as a human being views the synthetic image W, which is presented on the presenting unit 20, from, for example, a position in front of the presenting unit 20.

The housing 51 supports the input unit 16 and the imaging unit 14 (the first imaging unit 14A and the second imaging unit 14B). In the example illustrated in FIG. 2, the input unit 16 and the second imaging unit 14B are disposed in the housing 51 at both ends in the horizontal direction of the presenting unit 20. The first imaging unit 14A is disposed in the housing 51 in the upper part of the presenting unit 20. Meanwhile, the position of the input unit 16 is not limited to the position mentioned above. Moreover, as long as the first imaging unit 14A and the second imaging unit 14B are disposed at positions from which images of the photographic subject P can be captured, the positions are not limited to the positions mentioned above.

When the user operates the input unit 16 and issues instructions, a variety of information is input via the input unit 16. As described above, the first imaging unit 14A and the second imaging unit 14B sequentially capture images of the photographic subject P in synchronization at the same timings. Then, to the image processing device 12, the first imaging unit 14A and the second imaging unit 14B sequentially output the photographic subject images obtained by means of imaging.

Returning to the explanation with reference to FIG. 1, the memory unit 18 is used to store, in advance, clothing images that are to be superimposed on a photographic subject image. In the first embodiment, the explanation is given for a case in which the memory unit 18 is used to store a first table in which clothing numbers, posture information, the clothing images, and attribute information are held in a corresponding manner.

Figures 3, 4:
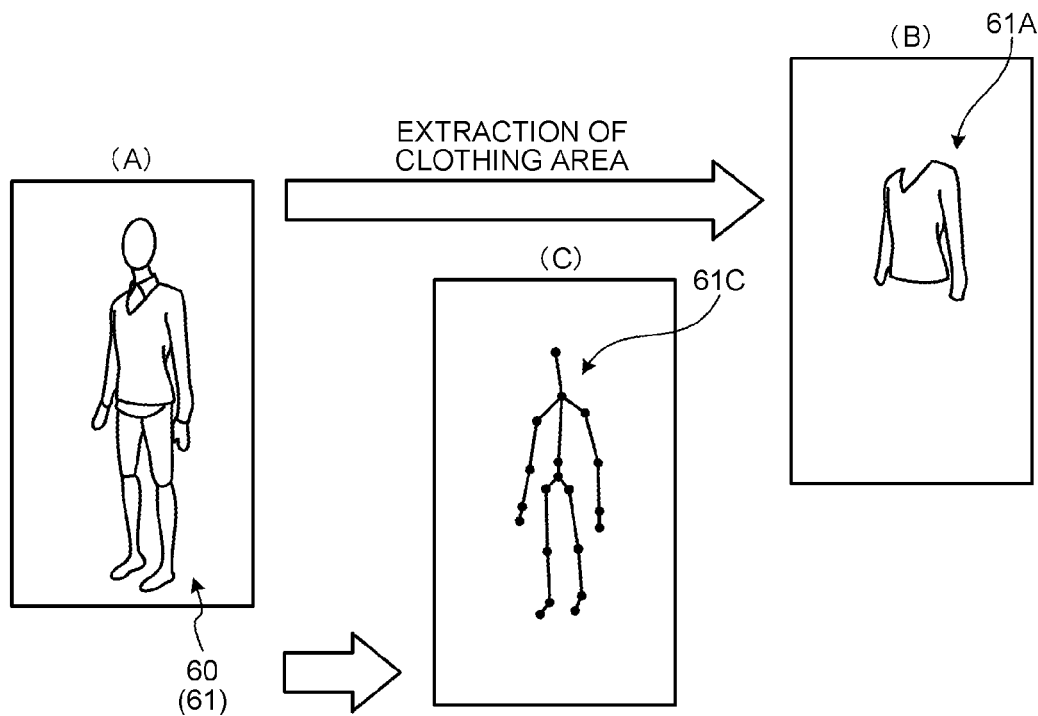
FIG. 3 is a schematic diagram illustrating an exemplary data structure of a first table according to the first embodiment.
FIG. 4 is a schematic diagram illustrating an example of posture information and a clothing image.

FIG. 3 is a schematic diagram illustrating an exemplary data structure of the first table.

A clothing number represents information that enables unique identification of a particular article of clothing. The clothing numbers can include, for example, product numbers and clothing names. However, that is not the only possible case. The product numbers can be, for example, the Japan Article Numbers (JAN). The clothing names can be, for example, the product names of articles of clothing.

Since the clothing numbers enable unique identification of articles of clothing, there are times when a plurality of clothing images having different posture information is associated to a single clothing number.

The posture information indicates the posture of a photographic subject that is the target for wearing the articles of clothing corresponding to the clothing image that is obtained. The posture information indicates the orientation or the movements of the photographic subject with respect to the imaging unit 14.

Herein, the orientation of a photographic subject points to the orientation of that photographic subject, who is wearing the articles of clothing corresponding to the clothing image that is obtained, with respect to the imaging unit 14. For example, the orientation of a photographic subject includes the frontal orientation in which the face and the body of the photographic surface is facing the imaging unit 14; a lateral orientation in which the face and the body of the photographic surface is lateral with respect to the imaging unit 14; and some other orientations other than the frontal orientation and the lateral orientation.

The movements of the photographic subject are represented by skeleton information that indicates the skeletal positions of the photographic subject wearing the articles of clothing corresponding to a clothing image. In the skeleton information, corresponding to the pixel position of each pixel constituting a clothing image, the information that indicates the skeletal position of the photographic subject wearing the articles of clothing corresponding to that clothing image is defined on a pixel-by-pixel basis.

In the first embodiment, it is assumed that the posture information contains the orientation of the photographic subject and the skeleton information.

Meanwhile, a clothing image is obtained by capturing an image of a photographic subject that is wearing clothing. For each pixel in a clothing image, a pixel value is defined that indicates the color of clothing or the brightness of clothing. Herein, as a clothing image, for example, an image is used that is obtained by the second imaging unit 14B by capturing the clothing.

The attribute information indicates the attributes of the corresponding clothing image. Regarding the articles of clothing that are captured in a clothing image; the attribute information contains, for example, the sizes, the colors, the materials, and the prices of those articles of clothing.

More particularly, for example, regarding a single type of clothing, assume that a clothing image captured from the front direction and a clothing image captured from the lateral direction are obtained in the image processing system 10. In this case, in the memory unit 18, the following information is stored in advance in a corresponding manner to the clothing number of the clothing: the frontal orientation of the photographic subject; the posture information containing the skeleton information of the photographic subject having the frontal orientation; and the clothing image that corresponds to the posture information and that is captured from the front direction. In an identical manner, in the memory unit 18, the following information is stored in advance in a corresponding manner to the clothing number of the clothing: the lateral orientation of the photographic subject; the posture information containing the skeleton information of the photographic subject having the lateral orientation; and the clothing image that corresponds to the posture information and that is captured from the lateral direction.

Meanwhile, as long as the first table contains the clothing numbers, the posture information, and the clothing images in a corresponding manner; it can do without the attribute information.

FIG. 4 is a schematic diagram illustrating an example of posture information and a clothing image.

As illustrated in (A) in FIG. 4, for example, a photographic subject 60 such as a dummy is provided that is wearing articles of clothing 61. Then, the imaging unit 14 captures an image of the photographic subject 60 and obtains a photographic subject image that contains a color image and a depth image. Subsequently, a clothing area is extracted from the color image obtained by means of imaging and, for example, a clothing image 61A is obtained as illustrated in (B) in FIG. 4. Moreover, from the depth image of the photographic subject 60, the pixel positions corresponding to the joint positions of a human body are extracted by implementing a known method; and skeleton information 61C (see (C) in FIG. 4) is created that indicates the skeletal positions of the photographic subject, who is wearing the clothing captured in the clothing image, corresponding to the pixel positions of the pixels constituting the clothing image.

In this way, in the image processing device 12, the first table, which contains the clothing images of clothing to be superimposed and the posture information, is provided in advance and is stored in advance in the memory unit 18.

Returning to the explanation with reference to FIG. 1, the image processing device 12 is a computer that includes a central processing unit (CPU), a read only memory (ROM), and a random access memory (RAM).

Moreover, the image processing device 12 is electrically connected to the imaging unit 14, the input unit 16, the memory unit 18, and the presenting unit 20.

Furthermore, the image processing device 12 includes a first obtaining unit 22, a receiving unit 24, a second obtaining unit 26, a determining unit 28, an adjusting unit 30, an extracting unit 32, a first calculating unit 34, a second calculating unit 36, a deciding unit 38, a generating unit 40, and a presentation control unit 42.

The first obtaining unit 22 sequentially obtains photographic subject images from the imaging unit 14. Moreover, the first obtaining unit 22 includes a third obtaining unit 22A and a fourth obtaining unit 22B. The third obtaining unit 22A sequentially obtains depth images of a photographic subject. The fourth obtaining unit 22B sequentially obtains color images of a photographic subject.

A photographic subject image is the image that exhibits a photographic subject. Thus, from the depth image that is obtained from the first imaging unit 14A, the third obtaining unit 22A extracts a human being area and thus obtains the depth image of the photographic subject. In an identical manner, from the color image that is obtained from the second imaging unit 14B, the fourth obtaining unit 22B extracts a human being area and thus obtains the color image of the photographic subject.

In order to extract a human being area, the first obtaining unit 22 sets, for example, a threshold value regarding the distance in the depth direction. For example, in the camera coordinate system of the first imaging unit 14A, the position of the first imaging unit 14A is considered as the origin, and the positive direction in the Z axis is considered as the optical axis of the camera extending from the origin of the first imaging unit 14A toward the photographic subject. In that case, from among the pixels constituting the depth image, such pixels are excluded that have the position coordinates in the depth direction (the Z-axis direction) equal to or greater than a predetermined threshold value (for example, a value indicating 2 m). With that, the first obtaining unit 22 obtains a depth image made of the pixels of the human being area that is present within the range of 2 m from the first imaging unit 14A. That is, the first obtaining unit 22 obtains the depth image of the photographic subject.

The receiving unit 24 receives a variety of information from the input unit 16.

The second obtaining unit 26 obtains, from the memory unit 18, the clothing images that are to be superimposed on a photographic subject image which is obtained by the first obtaining unit 22.

In the first embodiment, from the input unit 16, the second obtaining unit 26 receives clothing candidate information that is used in identifying the clothing to be superimposed. The clothing candidate information contains at least one of the items of attribute information such as the types, the sizes, the colors, the materials, and the prices of articles; or contains information that enables identification of at least one of the items of attribute information.

For example, the user operates the input unit 16 and inputs the types, the colors, and the sizes as the clothing candidate information.

Then, the second obtaining unit 26 analyzes the clothing candidate information received from the input unit 16 and searches in the memory unit 18 for a list of clothing images that either are identified by the clothing candidate information or correspond to the attribute information specified in the clothing candidate information. Subsequently, the presentation control unit 42 performs control for presenting the list of clothing images, which is retrieved by the second obtaining unit 26, on the presenting unit 20. That is, if a plurality of types of clothing images having different posture information is stored in the memory unit 18 in a corresponding manner to a single clothing number; then the presentation control unit 42 performs control to display a single clothing image corresponding to the representative posture information (for example, the frontal posture) on the presenting unit 20.

Once the list of clothing images is presented on the presenting unit 20, the user operates the input unit 16 and selects the clothing images to be superimposed from that list of clothing images. Then, the clothing numbers of the selected clothing images are output from the input unit 16 to the image processing device 12.

The receiving unit 24 receives the selected clothing numbers. Then, the second obtaining unit 26 obtains, from the memory unit 18, the clothing images that are identified by the clothing numbers received by the receiving unit 24.

The extracting unit 32 generates the skeleton information from the photographic subject image that is obtained by the first obtaining unit 22. More particularly, the extracting unit 32 generates the skeleton information that indicates the skeletal position of a human body for each pixel constituting the depth image of the photographic subject as obtained by the third obtaining unit 22A. Herein, the extracting unit 32 generates the skeleton information by applying the human body shape to the depth image.

Then, the extracting unit 32 converts the coordinate system of the pixel positions of the pixels in the skeleton information, which is calculated from the depth image of the photographic subject as obtained by the third obtaining unit 22A, (i.e., converts the coordinate system of the first imaging unit 14A) into the coordinate system of the pixel positions in the color image of the photographic subject as obtained by the fourth obtaining unit 22B (i.e., into the coordinate system of the second imaging unit 14B). That is, the extracting unit 32 converts the coordinate system of the pixel positions of the pixels in the skeleton information, which is calculated from the depth image of the photographic subject captured by the first imaging unit 14A, into the coordinate system of the color image of the photographic subject captured by the second imaging unit 14B at the same timing at which the depth image is captured. Such coordinate conversion is performed by means of known calibration.

The adjusting unit 30 enlarges or reduces at least either the clothing image to be superimposed or the photographic subject image in such a way that at least some part of the image outline of the clothing image matches with at least some part of the image outline of the photographic subject image. Moreover, from the clothing image that has been enlarged or reduced and from the photographic subject image that has been enlarged or reduced, the adjusting unit 30 extracts a feature area that is used by the first calculating unit 34 (described later).

More specifically, firstly, the adjusting unit 30 calculates the orientation of the photographic subject from the skeleton information of the photographic subject image as created by the extracting unit 32.

The adjusting unit 30 calculates the orientation of the photographic subject from the position of each joint specified in the skeleton information, which serves as the posture information that is calculated by the extracting unit 32 from the depth image of the photographic subject.

Figure 5:
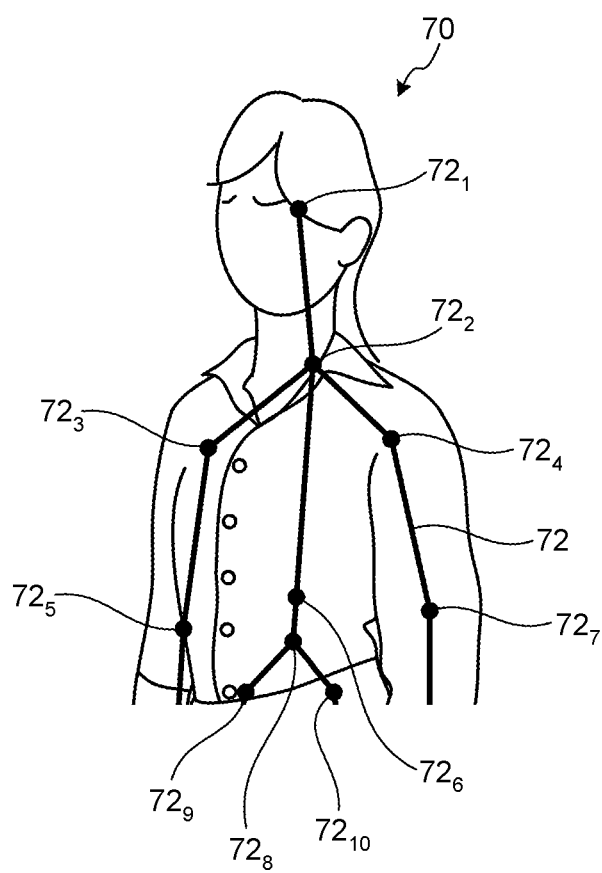
FIG. 5 is an explanatory diagram for explaining a method of calculating the orientation of a photographic subject according to the first embodiment.

FIG. 5 is an explanatory diagram for explaining the method by which the adjusting unit 30 calculates the orientation of the photographic subject.

In the coordinate system of the second imaging unit 14B, Psl is assumed to be the coordinate of the pixel position corresponding to the left shoulder of the photographic subject as indicated by the skeleton information of the photographic subject calculated by the extracting unit 32 (in FIG. 5, see a pixel position $72_4$). Moreover, in the coordinate system of the second imaging unit 14B, Psr is assumed to be the coordinate of the pixel position corresponding to the right shoulder of the photographic subject as indicated by the skeleton information serving as the posture information calculated by the extracting unit 32 (in FIG. 5, see a pixel position $72_3$).

By referring to such coordinate information, the adjusting unit 30 calculates the orientation of the photographic subject with respect to the imaging unit 14 (the second imaging unit 14B) according to Equation (1) given below.

$$\text{Orientation of photographic subject} = \arctan(Psl.z - Psr.z/Psl.x - Psr.x) \qquad (1)$$

In Equation (1), Psl.z represents the z-coordinate value of the pixel position corresponding to the left shoulder of the photographic subject; while Psr.z represents the z-coordinate value of the pixel position corresponding to the right shoulder of the photographic subject. Similarly, Psl.x represents the x-coordinate value of the pixel position corresponding to the left shoulder of the photographic subject; while Psr.x represents the x-coordinate value of the pixel position corresponding to the right shoulder of the photographic subject.

In an identical manner, the adjusting unit 30 can also obtain the posture information of the clothing images.

Then, from the memory unit 18 and from among the clothing images corresponding to the clothing numbers selected by the user, the adjusting unit 30 obtains the clothing image corresponding to the orientation of the photographic subject (i.e., corresponding to the posture information of the photographic subject) indicated in the photographic subject image.

Figure 6:
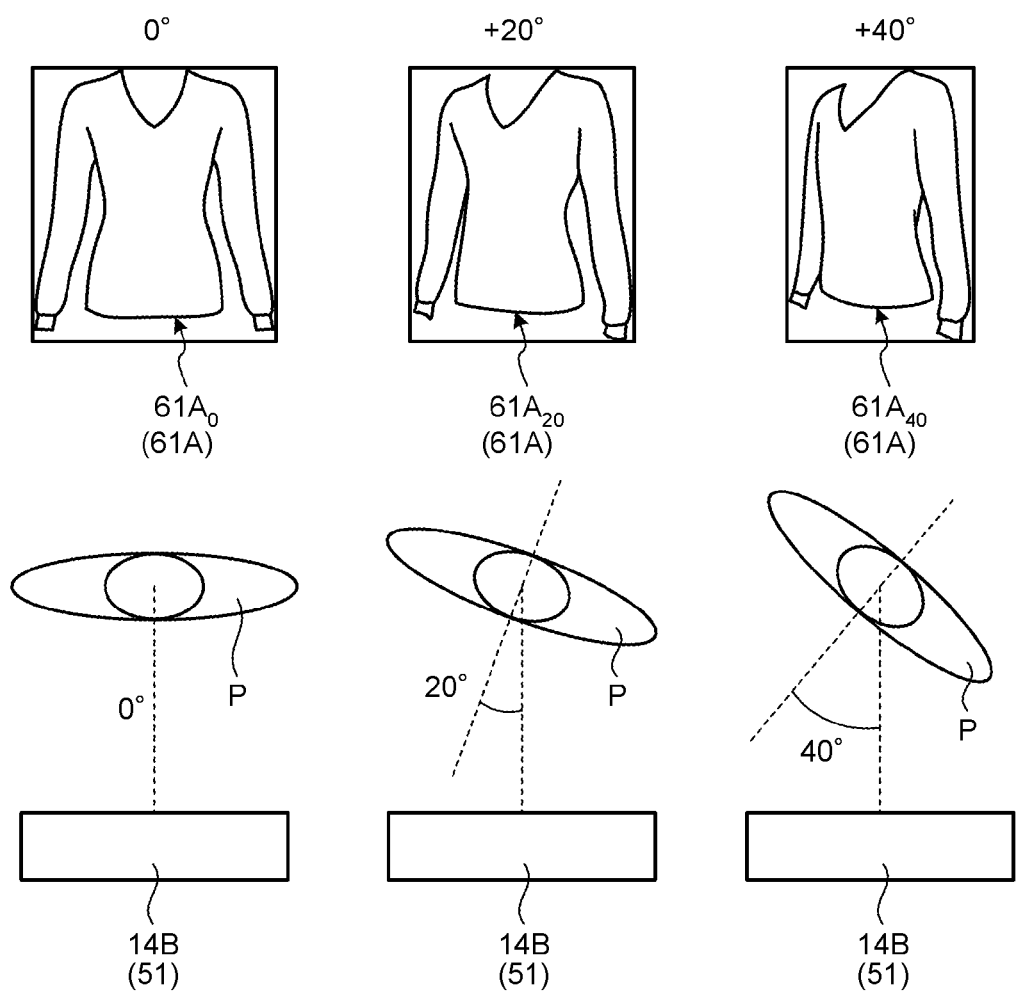
FIG. 6 is a schematic diagram illustrating three clothing images having different posture information.

FIG. 6 is a schematic diagram illustrating a case in which three clothing images capturing the same clothing but having different posture information are stored in the memory unit 18 in a corresponding manner to the same clothing number.

For example, as the clothing images that correspond to the clothing number selected by the user and that are stored in advance in the memory unit 18, assume that clothing images 61A ($61A_0$, $61A_{20}$, $61A_{40}$) are stored that respectively correspond to the following posture information: "0°" indicating the frontal orientation with respect to the second imaging unit 14B disposed in the housing 51; "+20° orientation" indicating the orientation at 20° on the right side from the frontal orientation; and "+40° orientation" indicating the orientation at 40° on the right side from the frontal orientation.

If it is indicated in the photographic subject image that the photographic subject has the frontal orientation; the adjusting unit 30 reads, from among the clothing images 61A ($61A_0$, $61A_{20}$, $61A_{40}$) that correspond to the clothing number selected by the user and that are stored in the memory unit 18, the clothing image $61A_0$ corresponding to the frontal orientation of the photographic subject.

Then, the extracting unit 32 converts the coordinate system of the depth image of the photographic subject as obtained by the third obtaining unit 22A (i.e., converts the coordinate system of the first imaging unit 14A) into the coordinate system of the color image of the photographic subject as obtained by the fourth obtaining unit 22B (i.e., into the coordinate system of the second imaging unit 14B). Subsequently, with the aim of adjusting the resolution of the depth image of the photographic subject to the resolution of the color image of the photographic subject, the adjusting unit 30 performs projection in such a way that the pixels constituting the post-coordinate-conversion depth image of the photographic subject have the pixel positions corresponding to the pixel positions of the pixels constituting the color image of the photographic subject obtained at the same timing.

For example, assume that the depth image of the photographic subject as obtained by the first imaging unit 14A has the resolution of 640×480 pixels, and the color image of the photographic subject as obtained by the second imaging unit 14B has the resolution of 1080×1920 pixels. In this case, if each pixel constituting the depth image is projected as a point of 1×1 pixel size onto the color image, then that causes gaps between the pixels constituting the depth image. For that reason, the adjusting unit 30 applies a filter making use of the Gaussian filter or a known operation such as the morphological operation and makes adjustment to ensure that there are no gaps between the pixels that constitute the depth image and that have been projected onto the color image.

Then, the adjusting unit 30 calculates the size of the feature area in the clothing image corresponding to the orientation of the photographic subject.

Herein, the feature area points to an area that enables estimation of the shape of the photographic subject on which the clothing is to be tried on. The feature area can be a shoulder area corresponding to the shoulders of a human body, a waist area corresponding to the waist of a human body, and a leg area corresponding to the length of legs of a human body. However, those are not the only possible feature areas. In the first embodiment, the explanation is given for a case in which the shoulder area corresponding to the shoulders of a human body serves as the feature area. However, that explanation is only exemplary.

For example, as the size of the feature area in the clothing image that corresponds to the orientation of the photographic subject, the adjusting unit 30 calculates the shoulder width in the clothing image.

Figure 7:
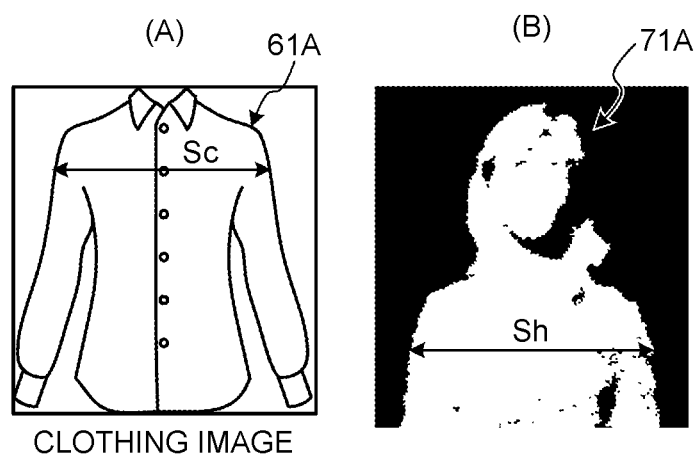
FIG. 7 is an explanatory diagram for explaining the calculation of the size of a feature area according to the first embodiment.

FIG. 7 is an explanatory diagram for explaining the calculation of the feature area in a clothing image done by the adjusting unit 30.

From the skeleton information included in the posture information regarding the clothing image that corresponds to the orientation of the photographic subject; the adjusting unit 30 obtains, from among the joint positions in the clothing image, the position of the Y-coordinate of the pixel at the pixel position corresponding to the left shoulder and the position of the Y-coordinate of the pixel at the pixel position corresponding to the right shoulder. Then, the adjusting unit 30 obtains the average Y-coordinate of the two Y-coordinates. Subsequently, at the positions (heights) of the Y-coordinates, the adjusting unit 30 performs a search from the X-coordinate of the pixel position corresponding to the left shoulder toward the area corresponding to the exterior of the clothing and obtains the X-coordinate indicating the position of the border line of the left shoulder side of the clothing. Similarly, at the positions (heights) of the Y-coordinates, the adjusting unit 30 performs a search from the X-coordinate of the pixel position corresponding to the right shoulder toward the area corresponding to the exterior of the clothing and obtains the X-coordinate indicating the position of the border line of the right shoulder side of the clothing.

Then, by calculating the difference between the two X-coordinates, it becomes possible to obtain the shoulder width (the pixel count) in the clothing image (see shoulder width Sc in the clothing image 61A illustrated in (A) in FIG. 7).

Meanwhile, the calculation need not be performed regarding the Y-coordinates of only the shoulder joints. Alternatively, by providing a range in the vertical direction of Y-coordinates around the Y-coordinates of the shoulder joints, the search can be performed regarding a plurality of lines in the horizontal direction and the shoulder width can be calculated by obtaining the average X-coordinate on each side in the horizontal direction.

Then, the adjusting unit 30 refers to the depth image of the photographic subject having been adjusted to the same resolution as the resolution of the color image and refers to the skeleton information of the photographic subject, and calculates the shoulder width of the photographic subject in the photographic subject image.

As illustrated in (B) in FIG. 7, the adjusting unit 30 obtains the average Y-coordinate of the Y-coordinate of the pixel position corresponding to the left shoulder and the Y-coordinate of the pixel position corresponding to the right shoulder in the depth image of the photographic subject. Then, the adjusting unit 30 performs a search from the X-coordinate at the pixel position corresponding to the left shoulder toward the area corresponding to the exterior of the photographic subject and obtains the X-coordinate indicating the position of the border line of one side of the photographic subject area.

Similarly, in the depth image of the photographic subject, the adjusting unit 30 performs a search from the X-coordinate at the pixel position corresponding to the right shoulder toward the area corresponding to the exterior of the photographic subject and obtains the X-coordinate indicating the position of the border line of the other side of the photographic subject area.

Then, by calculating the difference between the two X-coordinates, the adjusting unit 30 obtains the shoulder width (the pixel count) of the photographic subject in the image (see shoulder width Sh in a depth image 71A of the photographic subject as illustrated in (B) in FIG. 7).

Meanwhile, the adjusting unit 30 does not obtain the shoulder width regarding the Y-coordinates of only the shoulder joints. Rather, in a range in the vertical direction of Y-coordinates around the Y-coordinates of the shoulder joints, the adjusting unit 30 performs a search regarding a plurality of lines in the horizontal direction; and calculates the shoulder width by obtaining the average X-coordinate on both sides in the horizontal direction.

Subsequently, the adjusting unit 30 refers to the size of the feature area calculated in the manner described above and refers to the shoulder width Sc of the clothing image and the shoulder width Sh of the photographic subject, and determines the scaling value (the enlargement-reduction rate) of the clothing image.

More particularly, the adjusting unit 30 divides the shoulder width Sh of the photographic subject by the shoulder width Sc of the clothing image and sets the divided value (Sh/Sc) as the scaling value. Alternatively, the scaling value can also be calculated with a different formula using the actual size of the clothing or using the pixel count in the width and the pixel count in the height of a clothing image area.

Then, the adjusting unit 30 enlarges or reduces the clothing image (the color image), which is to be superimposed, by the enlargement-reduction rate identified from the scaling value. In an identical manner, even regarding the skeleton information included in the posture information of the clothing image to be superimposed, the adjusting unit 30 performs enlargement or reduction by the enlargement-reduction rate identified from the same scaling value (Sh/Sc).

Subsequently, from the clothing image that has been enlarged or reduced and from the photographic subject image that has been enlarged or reduced, the adjusting unit 30 extracts a feature area that is used by the first calculating unit 34 (described later).

Herein, the feature area points to such an area in the clothing image and in the photographic subject image that enables estimation of the shape of the photographic subject. The feature area can be an area representing the shoulders or the waist of a human body. In the first embodiment, the explanation is given for a case in which the area corresponding to the shoulders of a human body (i.e., a shoulder area) is extracted as the feature area from the image outline of the clothing image and from the image outline of the photographic subject image.

Firstly, the adjusting unit 30 extracts the image outline from the depth image of the photographic subject having been subjected to coordinate conversion and resolution adjustment. Moreover, the adjusting unit 30 extracts the image outline of the clothing image that has been enlarged or reduced to have the same scaling value as the scaling value of the photographic subject image. Herein, the image outlines are extracted by implementing a known method. Then, from the image outlines, the adjusting unit 30 extracts the image outline of the area corresponding to the shoulders of a human body (i.e., extracts the image outline of the shoulder area) as the feature area.

Herein, it is desirable that the adjusting unit 30 extracts the image outline according to the shape of the clothing image.

Figure 8:
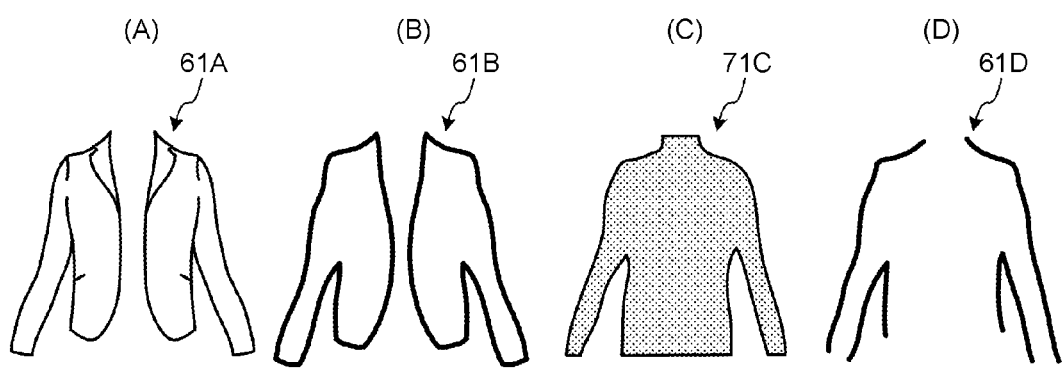
FIG. 8 is a schematic diagram illustrating an example of image outline extraction according to the first embodiment.

FIG. 8 is a schematic diagram illustrating an example of image outline extraction.

As illustrated in (A) in FIG. 8, assume that the clothing image 61A has a shape in which a vertically long opening is present on the front side of the human body. In this case, as illustrated in (B) in FIG. 8, the image outline is exhibited also in the central portion of the human body. If the first calculating unit 34 (described later) performs template matching using such an image outline, then sometimes there occurs a decline in the matching accuracy of the area corresponding to the central portion of the human body.

For that reason, when the clothing image 61A has a shape in which a vertically long opening is present on the front side of the human body, it is desirable that the adjusting unit 30 removes the image outline of the area corresponding to the central portion of the human body from the image outline illustrated in (B) in FIG. 8, and extracts an image outline 61D (see (D) in FIG. 8) of the portion along the outer shape of the human body as the image outline of the clothing image.

Meanwhile, in the image processing device 12, upon obtaining a clothing image, it is stored in advance in the memory unit 18 in a corresponding manner to the depth image of the photographic subject such as a dummy that was wearing the clothing captured in the clothing image. Then, the adjusting unit 30 performs image filtering such as a known morphological operation to remove, from the depth image, a portion of the inner area continuous to the image outline in the depth image; and prepares a post-removal depth image 71C (see (C) in FIG. 8). Then, from an image outline 61B illustrated in (B) in FIG. 8, the adjusting unit 30 removes the area that overlaps with the depth image 71C (see (C) in FIG. 8); and extracts the image outline 61D (see (D) in FIG. 8) of the portion along the outer shape of the human body as the image outline of the clothing image.

Subsequently, from the image outline of the clothing image and the image outline of the photographic subject image (the depth image), the adjusting unit 30 extracts the shoulder area, which corresponds to the shoulders of a human body, as the feature area.

Meanwhile, when the clothing identified in a clothing image is a tank top or a bare top, it sometimes becomes difficult to extract the shape along the outer shape of the human body (i.e., extract the image outline of shoulders) from the clothing image. In such a case, the depth image of the photographic subject, such as a dummy on which the trial fitting of clothing is done, can be stored in advance in the memory unit 18; and the image outline of the shoulder area can be calculated from the shoulders of the photographic subject.

The following explanation is given again with reference to FIG. 1.

The first calculating unit 34 calculates a first position of the clothing image in the photographic subject image in such a way that the position of the feature area in the clothing image to be superimposed matches with the position of the feature area in the photographic subject image as obtained by the first obtaining unit 22.

Moreover, the first calculating unit 34 calculates the first position if the determining unit 28 (described later) determines that the photographic subject image obtained by the first obtaining unit 22 satisfies a predetermined first condition. The determination operation performed by the determining unit 28 and the determination condition are described later in detail.

The first calculating unit 34 performs known template matching with respect to the feature area in the photographic subject image using the feature area in the clothing image as the template, and searches for the photographic subject image (the depth image). Then, as the first position, the first calculating unit 34 calculates such a position in the photographic subject image (the depth image) which matches with the feature area in the clothing image (in the first embodiment, the shoulder area).

The first position is represented by position coordinates in the photographic subject image. More particularly, when the feature area in the photographic subject image matches with the feature area in the clothing image; the first position in the photographic subject image is considered to be the center of the feature area in the photographic subject image. Thus, in the first embodiment, as the first position in the photographic subject image, the first calculating unit 34 calculates the center of the feature area (i.e., the shoulder area) in the photographic subject image.

The second calculating unit 36 calculates a second position of the clothing image in the photographic subject image in such a way that the position of a feature point, which is determined in advance according to the feature area, in the clothing image matches with the position of the feature point in the photographic subject image.

As described above, the first calculating unit 34 calculates the first position by performing template matching with respect to the feature area. In contrast, the second calculating unit 36 calculates the second position from the positions of the feature points. For that reason, the first calculating unit 34 is able to calculate the first position in a more accurate manner as compared to the second calculating unit 36. On the other hand, although there is a relative decline in the accuracy at which the second calculating unit 36 calculates the second position, the calculation can be performed at a lower processing load as compared to the calculation performed by the first calculating unit 34.

The feature point is a position that enables estimation of the body type of the photographic subject on which trial fitting of the clothing is done. The feature point is determined in advance according to the feature area. For example, the feature point is determined to be the position corresponding to the center of the feature area that is used by the first calculating unit 34. For that reason, the feature point is set in advance according to the area used as the feature area by the first calculating unit 34. Moreover, the feature point is represented by position coordinates in the image.

In the first embodiment, the first calculating unit 34 uses the shoulder area as the feature area. Hence, the explanation is given for a case in which the second calculating unit 36 determines, as the feature point, the center of the shoulder area which points to the position in the center of both shoulders of a human body.

Figure 9:
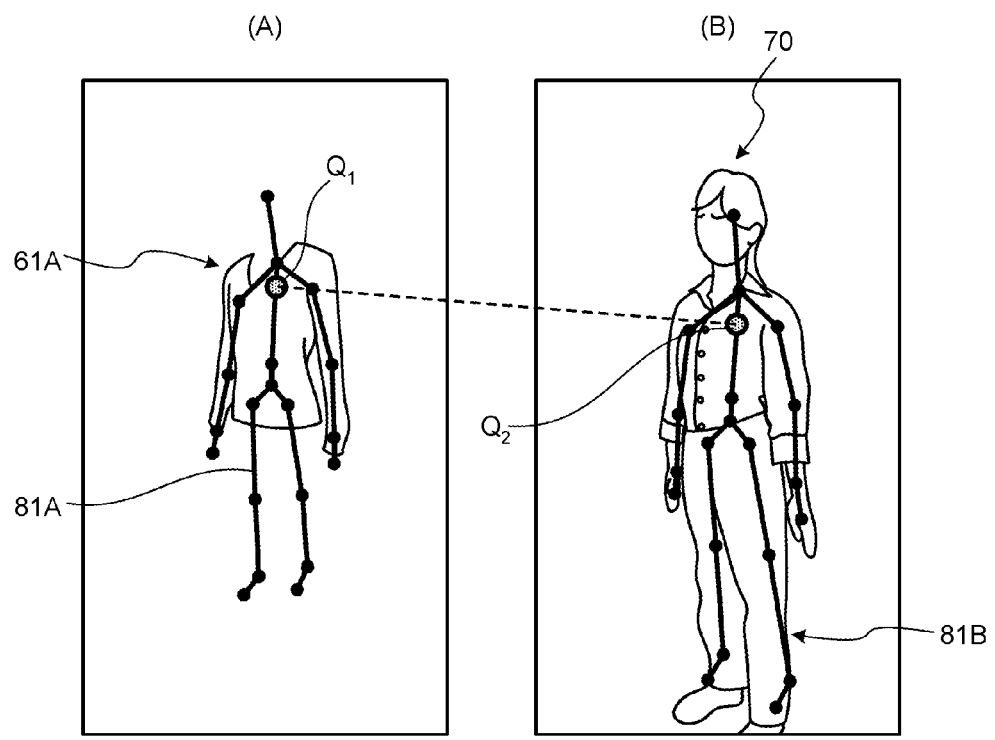
FIG. 9 is a schematic diagram illustrating an example of calculating a second position according to the first embodiment.

FIG. 9 is a schematic diagram illustrating an example of the calculation of the second position done by the second calculating unit 36.

For example, from skeleton information 81A of the clothing image 61A illustrated in (A) in FIG. 9, the second calculating unit 36 obtains a center $Q_1$ between both shoulders. Moreover, from skeleton information 81B of a photographic subject image 70 illustrated in (B) in FIG. 9, the second calculating unit 36 obtains a center $Q_2$ between both shoulders. Then, the second calculating unit 36 calculates the second position of the clothing image 61A in the photographic subject image 70 in such a way that the center $Q_1$ between both shoulders in the clothing image 61A matches with the center $Q_2$ between both shoulders in the photographic subject image 70. In the first embodiment, as the second position, the second calculating unit 36 calculates the center $Q_2$ between both shoulders in the photographic subject image 70.

Returning to the explanation with reference to FIG. 1, the determining unit 28 determines whether or not the photographic subject image obtained by the first obtaining unit 22 satisfies the predetermined first condition.

Herein, the first condition points to a condition for determining whether or not the first position is to be calculated by the first calculating unit 34. That is, only when the determining unit 28 determines that the photographic subject image obtained by the first obtaining unit 22 satisfies the first condition, the first calculating unit 34 calculates the first position. In contrast, the second calculating unit 36 calculates the second position irrespective of whether the determining unit 28 determines that the photographic subject image obtained by the first obtaining unit 22 satisfies the first condition or determines that the photographic subject image obtained by the first obtaining unit 22 does not satisfy the first condition.

The first condition includes following conditions. Moreover, as the first condition, it is possible either to set any one of the following conditions or to set a plurality of arbitrary conditions from among the following conditions.

As the first condition, it is possible to set a condition in which there is a change in the photographic subject present in the area captured by the imaging unit 14.

In this case, the determining unit 28 refers to the coordinate values of the joint positions of the photographic subject in the depth image that is obtained as the photographic subject image by the first obtaining unit 22, and determines whether or not a human being is present as the photographic subject within a predetermined distance from the presenting unit 20. Then, if it is determined that a photographic subject image obtained at a particular timing contains a human being as the photographic subject, if it is determined that a photographic subject image obtained at a later timing does not contain a human being as the photographic subject image, and if it is determined that a photographic subject image obtained at a still later timing again contains a human being as the photographic subject image; then the determining unit 28 determines that there is a change in the human being present in the area captured by the imaging unit 14. With that, the determining unit 28 determines that the photographic subject image that is currently obtained satisfies the first condition determined in advance by the determining unit 28.

For example, when there is a change in the photographic subject on which trial fitting is to be done in front of the presenting unit 20; since the body type also differs, it is desirable to calculate the positions (the first position or the second position) in a more accurate manner. For that reason, by setting the condition of a change in the human being present in the area captured by the imaging unit 14 as the determination condition of the determining unit 28, it becomes possible to enhance the accuracy of the superimposition position (described later).

Meanwhile, if the first position is calculated from a photographic subject image that is captured while the human being positioned in front of the presenting unit 20 is in motion, then there is a possibility of a decline in the calculation accuracy. For that reason, as the photographic subject image satisfying the first condition, it is desirable that the determining unit 28 determines such a photographic subject image that is obtained not only after the elapse of a certain period of time following a change in the human being present in the area captured by the imaging unit 14 but also after the detection of the stillness of the human being.

In order to detect the movement or the stillness of a human being, it is possible to make use of a known image processing technology.

Meanwhile, another example of the first condition is a condition in which the user operates the input unit 16 and, as the target clothing number for trial fitting, specifies a different clothing number than the clothing number associated to the clothing image that is included in the synthetic image being presented.

In this case, the determining unit 28 determines whether or not the photographic subject image obtained by the first obtaining unit 22 is obtained immediately after the user has specified a new clothing number by operating the input unit 16. With that, the determining unit 28 determines that the photographic subject image that is currently obtained satisfies the first condition determined in advance by the determining unit 28.

Meanwhile, if the first position is calculated from a photographic subject image that is captured while the photographic subject doing trial fitting in front of the presenting unit 20 is in motion for the purpose of operating the input unit 16, then there is a possibility of a decline in the calculation accuracy. For that reason, as the photographic subject image satisfying the first condition, it is desirable that the determining unit 28 determines such a photographic subject image that is obtained not only after the elapse of a certain period of time following the determination that the user has operated the input unit 16 but also after the detection of the stillness of the human being.

Still another example of the first condition is a condition in which the photographic subject image under consideration is obtained after obtaining a predetermined number of photographic subject images following the previous determination of the target photographic subject image for first position calculation.

In this case, the determining unit 28 determines whether or not the photographic subject image under consideration, which is obtained by the first obtaining unit 22, is obtained after obtaining a predetermined number of photographic subject images following the obtaining of the photographic subject image that was determined to be the previous target photographic subject image for first position calculation. With that, the determining unit 28 determines that the photographic subject image that is currently obtained satisfies the first condition determined in advance by the determining unit 28.

Herein, as an example, 15 photographic subject images (or in the case of a dynamic image, 15 frames) are obtained as the predetermined number of photographic subject images. However, that is not the only possible number. Moreover, higher the processing load of the first calculating unit 34, greater is the number of photographic subject images that can be set; and greater the amount of movement of the photographic subject, greater is the number of photographic subject images that can be set. Meanwhile, it is also possible to combine such setting conditions and determine the interval of obtaining the photographic subject image determined to satisfy the first condition.

The determining unit 28 can also determine whether or not the photographic subject image under consideration, which is obtained by the first obtaining unit 22, is obtained after the elapse of a certain amount of time following the obtaining of the photographic subject image that was determined to be the previous target photographic subject image for first position calculation. With that, the determining unit 28 determines that the photographic subject image that is currently obtained satisfies the first condition determined in advance by the determining unit 28.

In this case too, depending on the amount of movement of the photographic subject image or depending on the processing load of the first calculating unit 34, the determining unit 28 can set the elapsed time for determining that the first condition is satisfied.

Still another example of the first condition is a condition in which the posture information of the clothing image specified by the user by operating the input unit 16 matches with the posture information of the photographic subject.

In this case, the determining unit 28 determines whether or not the skeleton information created by the extracting unit 32 from the photographic subject image obtained by the first obtaining unit 22 matches with the skeleton information that is stored in the memory unit 18 and that is included in the posture information of the clothing image specified by the user by operating the input unit 16. If the two sets of skeleton information are matching, the determining unit 28 determines that the photographic subject image that is currently obtained satisfies the first condition determined in advance by the determining unit 28.

If the posture of the photographic subject does not match with the target for superimposition stored in the memory unit 18, that is, does not match with the posture in the clothing image of the target clothing for trial fitting; then, despite performing template matching using the first calculating unit 34, there are times when it is difficult to achieve a sufficiently accurate match.

In that regard, if the posture information of the clothing image specified by the user by operating the input unit 16 matches with the posture information of the photographic subject, it is desirable that the determining unit 28 determines that the photographic subject image satisfies the first condition determined in advance by the determining unit 28.

Still another example of the first condition is a condition in which the amount of movement of the photographic subject captured in the photographic subject image is equal to or smaller than a predetermined amount.

In this case, by referring to the coordinate values of the joint positions of the photographic subject captured in the depth image that is obtained as the photographic subject image by the first obtaining unit 22, the determining unit 28 determines the position of the human being who serves as the photographic subject captured in the photographic subject image. Then, the determining unit 28 compares the position of the human being in the previous depth image obtained as the previous photographic subject image with the position of the human being in the current depth image obtained as the current photographic subject image, and calculates the amount of movement of that human being. If it is determined that the amount of movement of the human being is equal to or smaller than the predetermined amount, then the determining unit 28 determines that the photographic subject image that is currently obtained satisfies the first condition determined in advance by the determining unit 28.

Still another example of the first condition is a condition in which the human being, who serves as the photographic subject captured in the photographic image that is obtained, has lowered the arms.

In this case, by referring to the coordinate values of the joint positions of the photographic subject captured in the depth image obtained by the first obtaining unit 22, the determining unit 28 determines whether or not the arms of the photographic subject are positioned on the lower side (toward the legs) as compared to the shoulders. If the human being, who serves as the photographic subject captured in the photographic image that is obtained (i.e., captured in the depth image), has lowered the arms; then the determining unit 28 determines that the photographic subject image that is currently obtained satisfies the first condition determined in advance.

If the human being serving as the photographic subject has raised the arms, then it is highly likely that the posture information of the clothing image to be superimposed is different than the posture information of the photographic subject. If the first calculating unit 34 performs template matching with the use of a photographic subject image in which the photographic subject raising the arms is captured, then sometimes there is a decline in the accuracy of template matching. In that regard, when it is determined that the human being, who serves as the photographic subject captured in a photographic subject image, has lowered the arms; it is desirable that the determining unit 28 determines that the currently-obtained photographic subject image satisfies the first condition determined in advance.

Given below is the explanation of the deciding unit 38.

If the determining unit 28 determines that the photographic subject image that is currently obtained by the first obtaining unit 22 satisfies the first condition; then the deciding unit 38 decides on the first position, which is calculated by the first calculating unit 34, as the superimposition position in the photographic subject image at which a clothing image is to be superimposed.

On the other hand, if the determining unit 28 determines that the photographic subject image that is currently obtained by the first obtaining unit 22 does not satisfy the first condition; then the deciding unit 38 decides on the superimposition position on the basis of the difference between the first position calculated from a first photographic subject image, which is the photographic subject image obtained previous to the currently-obtained photographic subject image, and the second position calculated by the second calculating unit 36 from the first photographic subject image.

More particularly, when the determining unit 28 determines that the photographic subject image that is currently obtained by the first obtaining unit 22 does not satisfy the first condition; the deciding unit 38 shifts the second position, which is calculated by the second calculating unit 36 from the currently-obtained photographic subject image, by an amount equivalent to the abovementioned difference and decides on the shifted second position as the superimposition position.

Thus, when the photographic subject image obtained by the first obtaining unit 22 previous to obtaining the currently-obtained photographic subject image satisfies the first condition, the abovementioned difference points to the difference between the first position calculated by the first calculating unit 34 from the previously-obtained photographic subject image (the first photographic subject image) and the second position calculated by the second calculating unit 36 from the previously-obtained photographic subject image (the first photographic subject image).

The generating unit 40 generates a synthetic image by superimposing a clothing image at the superimposition position in the currently-obtained photographic subject image as decided by the deciding unit 38.

More specifically, the generating unit 40 superimposes the clothing image (the color image) to be superimposed, which is specified by the user by operating the input unit 16 and which is adjusted by the adjusting unit 30, at the superimposition position in the color image of the photographic subject obtained by the first obtaining unit 22 as the photographic subject image. With that, the generating unit 40 generates a synthetic image.

More particularly, regarding the clothing image that is adjusted by the adjusting unit 30, the generating unit 40 refers to color values (Cr, Cg, Cb) and an alpha value (a) defined on a pixel-by-pixel basis. Herein, the alpha value (a) is equal to or greater than 0 but equal to or smaller than 1. Moreover, regarding the color image of the photographic subject too, the generating unit 40 refers to color values (Ir, Ig, Ib) defined on a pixel-by-pixel basis. Then, according to Equation (2) given below, the generating unit 40 sets the pixel value (the color values and the alpha value) on a pixel-by-pixel basis at the same pixel positions, and generates a synthetic image.

Meanwhile, in the case when a clothing image occupies only some area of the color image of the photographic subject; in the area other than the occupied area of the clothing image, the calculation is done by considering the alpha value to be equal to zero (a=0).

$$Ox = (1-a) \times Ix + a \times Cx \qquad (2)$$

In Equation (2), "x" represents "r", "b", and "g".

Then, the presentation control unit 42 performs control to display the synthetic image on the presenting unit 20.

Given below is the explanation of the image processing performed in the image processing device 12 according to the first embodiment.

Figure 10:
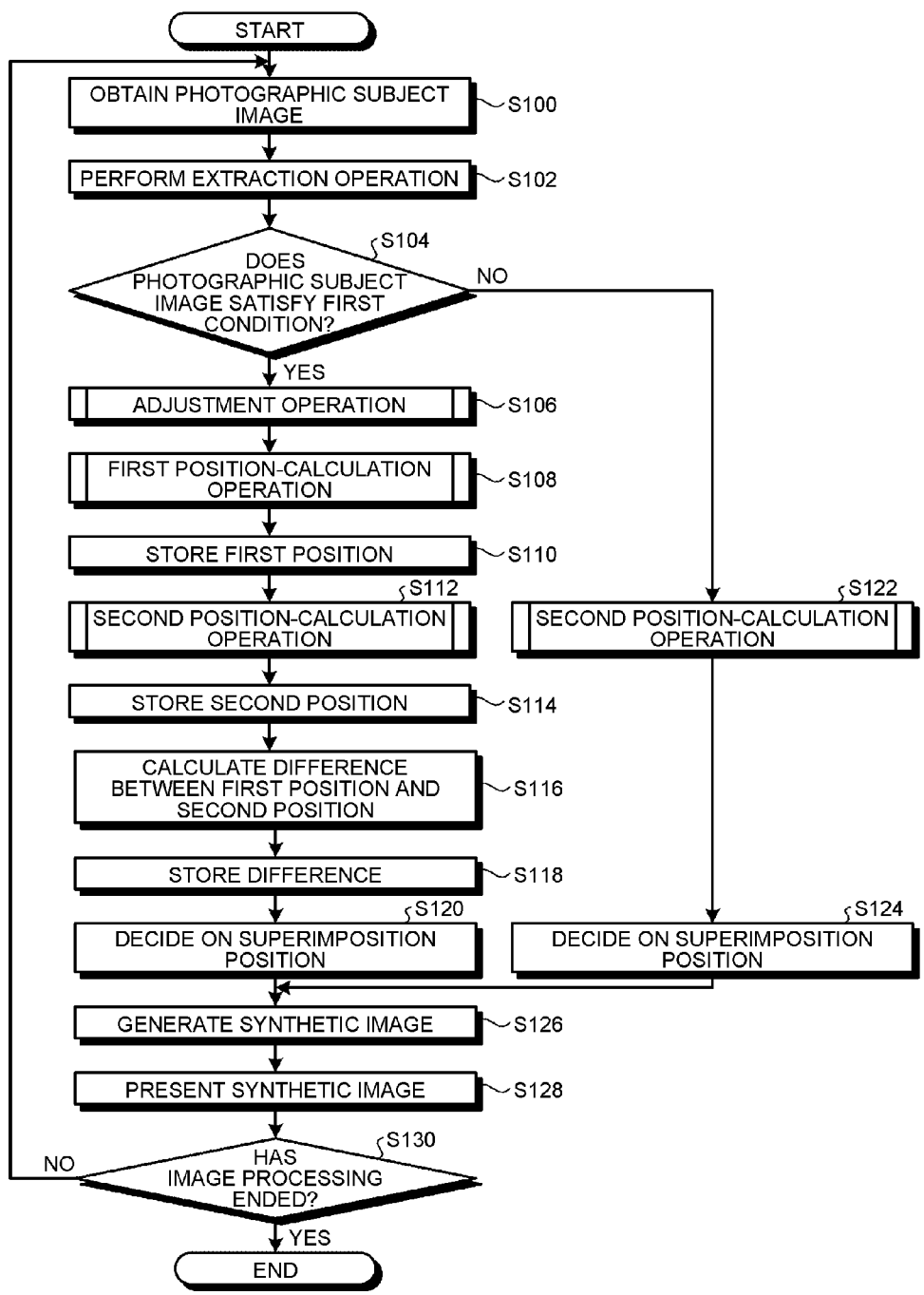
FIG. 10 is a flowchart for explaining a sequence of operations during image processing performed according to the first embodiment.

FIG. 10 is a flowchart for explaining a sequence of operations during the image processing performed in the image processing device 12 according to the first embodiment.

In the image processing device 12, every time a single photographic subject image (which contains a single depth image of the photographic subject and a single color image of the photographic subject that are captured at the same time) is received from the imaging unit 14, the operations from Step S100 to Step S130 are performed. Meanwhile, if the image processing device 12 receives a dynamic image, which contains a plurality of frames, from the imaging unit 14; then the image processing device 12 performs the operations from Step S100 to Step S130 with respect to each frame.

Firstly, the first obtaining unit 22 obtains a photographic subject image (Step S100).

Then, the extracting unit 32 performs an extraction operation (Step S102). More particularly, at Step S102, the extracting unit 32 generates skeleton information from the depth image of the photographic subject obtained at Step S100. In the first embodiment, the extracting unit 32 converts the coordinate system of the skeleton information of the photographic subject (i.e., converts the coordinate system of the first imaging unit 14A) into the coordinate system of the second imaging unit 14B.

Subsequently, the determining unit 28 determines whether or not the photographic subject image, which is obtained at Step S100, satisfies the first condition (Step S104).

If it is determined that the photographic subject image satisfies the first condition (Yes at Step S104), then the system control proceeds to Step S106.

Then, the adjusting unit 30 performs an adjustment operation (Step S106). That is, at Step S106, the adjusting unit 30 enlarges or reduces at least either a clothing image that is to be superimposed or the photographic subject image in such a way that at least some part of the image outline of the clothing image matches with at least some part of the image outline of the photographic subject image. Moreover, from the clothing image that has been enlarged or reduced and from the photographic subject image that has been enlarged or reduced, the adjusting unit 30 extracts the feature area that is used by the first calculating unit 34.

Herein, the clothing image to be superimposed is obtained during the adjustment operation performed by the adjusting unit 30. The details regarding the sequence of operations performed during the adjustment operation at Step S106 are given later.

Then, the first calculating unit 34 performs a first position-calculation operation (Step S108). That is, at Step S108, the first calculating unit 34 calculates the first position of the clothing image to be superimposed, which is obtained by the adjusting unit 30, in the photographic subject image in such a way that the position of the feature area in the clothing image matches with the position of the feature area in the photographic subject image obtained at Step S100. The details regarding the sequence of operations performed during the first position-calculation operation at Step S108 are given later.

Then, in the memory unit 18, the first calculating unit 34 stores the first position in a corresponding manner to the information that enables identification of the photographic subject image obtained at Step S100 (Step S110). Herein, the information that enables identification of the photographic subject image points to, for example, the time and date of obtaining that photographic subject image.

Subsequently, the second calculating unit 36 performs a second position-calculation operation (Step S112). That is, at Step S112, the second calculating unit 36 calculates a second position of the clothing image to be superimposed, which is obtained by the adjusting unit 30, in the photographic subject image in such a way that the position of the feature point in the clothing image matches with the position of the feature point in the photographic subject image. The details regarding the sequence of operations performed during the second position-calculation operation are given later.

Then, in the memory unit 18, the second calculating unit 36 stores the second position in a corresponding manner to the information that enables identification of the photographic subject image obtained at Step S100 (Step S114). Herein, the information that enables identification of the photographic subject image can be same as the information used at Step S110.

Subsequently, the deciding unit 38 reads the first position, which is calculated at Step S108, and the second position, which is calculated at Step S112, from the memory unit 18; and calculates the difference therebetween (Step S116). Then, in the memory unit 18, the deciding unit 38 stores the calculated difference in a corresponding manner to the information that enables identification of the photographic subject image and that is used at Step S110 and Step S114 (Step S118).

Meanwhile, if a difference is already stored in the memory unit 18, the deciding unit 38 can overwrite the already-stored difference with the difference that is newly calculated at Step S116. Thus, in the memory unit 18, the deciding unit 38 may store only the latest difference calculated at Step S116.

Then, the deciding unit 38 decides on the superimposition position (Step S120). That is, at Step S120, the deciding unit 38 decides on the first position, which is calculated at Step S108, as the superimposition position in the photographic subject image, which is obtained at Step S100, at which the clothing image to be superimposed, which is calculated during the adjustment operation performed at Step S106, is to be superimposed. Then, the system control proceeds to Step S126 (described later).

As a result of the operations from Step S104 to Step S120, in the image processing device 12, when it is determined that the photographic subject image obtained at Step S100 satisfies the first condition, the first position calculated by the first calculating unit 34 is decided to be the superimposition position in the photographic subject image at which the clothing image is to be superimposed.

Meanwhile, if it is determined that the photographic subject image does not satisfy the first condition (No at Step S104), then the system control proceeds to Step S122. Then, in an identical manner to Step S112, the second calculating unit 36 performs a second position-calculation operation (Step S122) (described later in detail).

Then, the deciding unit 38 decides on the superimposition position (Step S124).

More particularly, from the memory unit 18, the deciding unit 38 reads the difference between the first position, which is calculated by the first calculating unit 34 from the photographic subject image obtained previous to the currently-obtained photographic subject image (i.e., from the first photographic subject image), and the second position, which is calculated by the second calculating unit 36 from the photographic subject image used in calculating the first position (i.e., from the first photographic subject image).

Herein, from among the differences stored in the memory unit 18, the deciding unit 38 reads the latest difference (i.e., the difference calculated the previous time). Then, the deciding unit 38 shifts the second position, which is calculated from the currently-obtained photographic subject image obtained at Step S122, by an amount equivalent to the difference that has been read and decides on the shifted second position as the superimposition position.

Herein, the direction of shifting the second position, which is calculated from the currently-obtained photographic subject image obtained at Step S122, is parallel to the directional vector that has the second position calculated previously by the second calculating unit 36 as the start point and has the first position calculated previously by the first calculating unit 34 as the end point. Then, the system control proceeds to Step S126.

Subsequently, the generating unit 40 generates a synthetic image (Step S126). That is, at Step S126, the generating unit 40 generates a synthetic image by superimposing the clothing image to be superimposed, which has been obtained during the adjustment operation performed at Step S106 and which has been enlarged or reduced according to the photographic subject image, at the superimposition position in the color image of the photographic subject obtained at Step S100.

Then, the presentation control unit 42 performs control to present the synthetic image, which is generated at Step S126, on the presenting unit 20 (Step S128).

Subsequently, the image processing device 12 determines whether or not the image processing is ended (Step S130). The determination at Step S130 is performed, for example, by determining whether or not a signal indicating the end of image processing is received as a result of the user operating an end instruction button (not illustrated) on the image processing device 12.

If it is determined that the image processing is not ended (No at Step S130), then the system control returns to Step S100. On the other hand, if it is determined that the image processing is ended (Yes at Step S130), then that marks the end of the present routine.

Given below is the explanation of the adjustment operation performed at Step S106.

Figure 11:
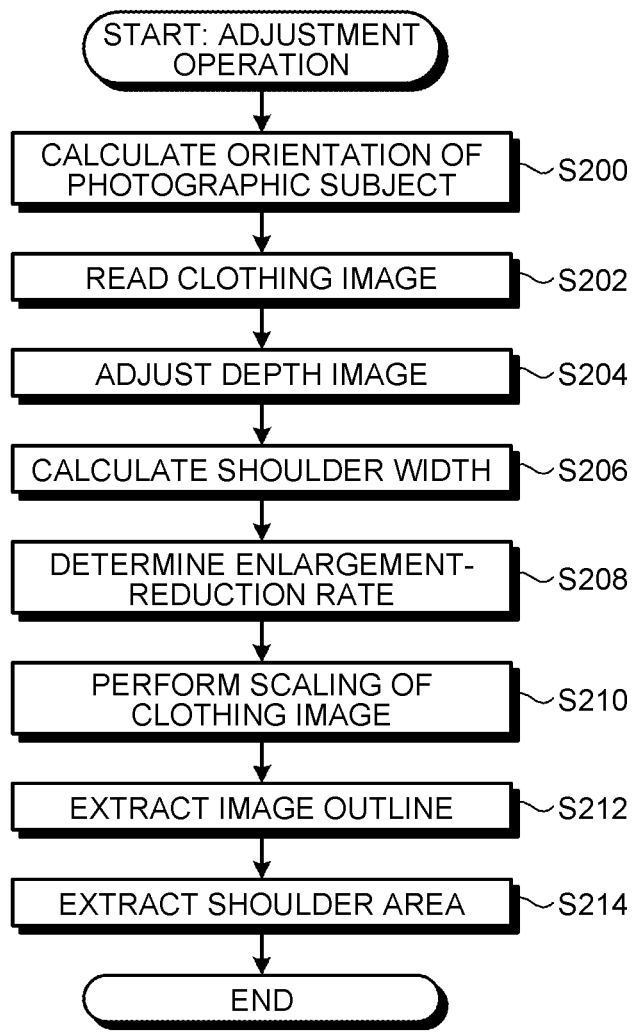
FIG. 11 is a flowchart for explaining a sequence of operations during an adjustment operation performed according to the first embodiment.

FIG. 11 is a flowchart for explaining a sequence of operations during the adjustment operation performed by the adjusting unit 30.

Firstly, the adjusting unit 30 calculates the orientation of the photographic subject from the skeleton information of the photographic subject created by the extracting unit at Step S102 (see FIG. 10) (Step S200).

Then, from among the clothing images corresponding to the clothing number that is selected by the user, the adjusting unit 30 reads the clothing image having the posture information corresponding to the orientation of the photographic subject (i.e., corresponding to the posture information of the photographic subject), which is calculated at Step S200, from the first table stored in the memory unit 18 (Step S202).

Subsequently, the adjusting unit 30 adjusts the depth image of the photographic subject obtained by the third obtaining unit 22A (Step S204). More particularly, the adjusting unit 30 converts the coordinate system of the pixel position of each pixel in the depth image of the photographic subject (i.e., converts the coordinate system of the first imaging unit 14A) into the coordinate system of the second imaging unit 14B. Then, the adjusting unit 30 performs projection in such a way that the pixels constituting the post-coordinate-conversion depth image of the photographic subject have the pixel positions corresponding to the pixel positions of the pixels constituting the color image of the photographic subject obtained at the same timing. With that, the adjusting unit 30 adjusts the resolution of the depth image of the photographic subject to the resolution of the color image of the photographic subject.

Subsequently, the adjusting unit 30 calculates the size of the feature area in the clothing image that is read at Step S202 as well as calculates the size of the feature area in the photographic subject image (Step S206). As described above, in the first embodiment, the shoulder area is considered to be the feature area. Thus, in the first embodiment, the adjusting unit 30 calculates the shoulder width in the clothing image that is read at Step S202 as well as calculates the size of the shoulder width in the photographic subject image that is obtained at Step S100 (see FIG. 10).

Then, from the sizes of the feature areas calculated at Step S206, that is, from the shoulder width in the clothing image and the shoulder width in the photographic subject image; the adjusting unit 30 determines the scaling value (the enlargement-reduction rate) of the clothing image (Step S208).

Subsequently, the adjusting unit 30 scales (enlarges or reduces) the clothing image, which is read at Step S202, by the enlargement-reduction rate identified from the scaling value determined at Step S208 (Step S210). In an identical manner, even regarding the skeleton information included in the posture information of the clothing image to be superimposed, the adjusting unit 30 performs enlargement or reduction by the enlargement-reduction rate identified from the same scaling value.

Then, the adjusting unit 30 extracts the feature area from the clothing image that has been enlarged or reduced at Step S210 and extracts the feature area from the photographic subject image that is obtained at Step S100 (see FIG. 10).

In that regard, firstly, the adjusting unit 30 extracts the image outline of the clothing image that has been enlarged or reduced at Step S210 and extracts the image outline of the photographic subject image that is obtained at Step S100 (see FIG. 10) (Step S212). Then, the adjusting unit 30 extracts the shoulder area from the image outline of the clothing image as well as extracts the shoulder area from the image outline of the photographic subject image (Step S214). That marks the end of the present routine.

At Step S208, the explanation is given for a case in which the scaling value (the enlargement-reduction rate) of the clothing image is determined, and the clothing image is scaled by the enlargement-reduction rate identified from the scaling value. However, alternatively, the enlargement-reduction rate of at least either the clothing image or the photographic subject image can be obtained in order to ensure that the image outline of the clothing image at least partially matches with the image outline of the photographic subject image. Then, the photographic subject image can be scaled by the reciprocal number of the enlargement-reduction rate of the clothing image.

By performing the operations from Step S200 to Step S214, the adjusting unit 30 enlarges or reduces at least either the clothing image to be superimposed or the photographic subject image in such a way that at least some part of the image outline of the clothing image matches with at least some part of the image outline of the photographic subject image. Moreover, from the clothing image that has been enlarged or reduced as well as from the photographic subject image that has been enlarged or reduced, the adjusting unit 30 extracts the shoulder area as the feature area.

Given below is the explanation of the sequence of operations during the first position-calculation operation performed by the first calculating unit 34 at Step S108 illustrated in FIG. 10.

Figure 12:
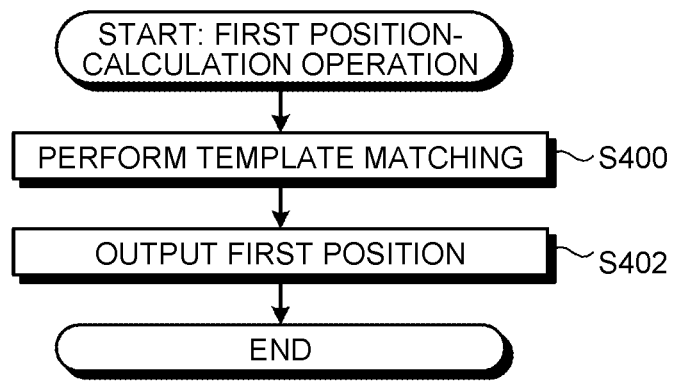
FIG. 12 is a flowchart for explaining a sequence of operations during a first position-calculation operation performed according to the first embodiment.

FIG. 12 is a flowchart for explaining a sequence of operations during the first position-calculation operation performed by the first calculating unit 34.

The first calculating unit 34 performs known template matching with the use of the shoulder area in the photographic subject image and the shoulder area in the clothing image that are extracted as the feature area by the adjusting unit 30 (Step S400). That is, at Step S400, the first calculating unit 34 performs known template matching and searches for the depth image of the photographic subject that has been adjusted by the adjusting unit 30; and, as the first position, calculates such a position in the depth image which matches with the feature area (i.e., the shoulder area) in the clothing image.

Then, the first calculating unit 34 outputs the calculated first position to the determining unit (Step S402). That marks the end of the present routine.

Given below is the explanation of the sequence of operations during the second position-calculation operation performed by the second calculating unit 36 at Step S112 and Step S122 illustrated in FIG. 10.

Figure 13:
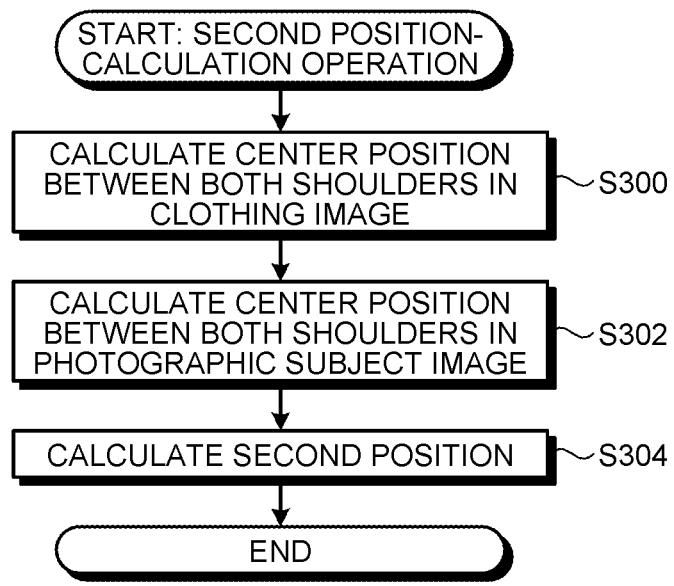
FIG. 13 is a flowchart for explaining the sequence of operations during a second position-calculation operation performed according to the first embodiment.

FIG. 13 is a flowchart for explaining the sequence of operations during the second position-calculation operation performed by the second calculating unit 36.

Firstly, as the feature point in the clothing image, the second calculating unit 36 calculates the center position between both shoulders in the clothing image (Step S300).

Then, the second calculating unit 36 calculates the center position between both shoulders in the photographic subject image (Step S302). More particularly, the second calculating unit 36 calculates the center position between both shoulders of the photographic subject by referring to the skeleton information of the photographic subject that is created by the extracting unit 32 at Step S106 (see FIG. 10).

Subsequently, the second calculating unit 36 calculates the second position in such a way that the center position calculated at Step S300 matches with the center position calculated at Step S302 (Step S304). In the first embodiment, as the second position, the second calculating unit 36 calculates the center position between both shoulders in the photographic subject image as calculated at Step S302.

That marks the end of the present routine.

Figure 14:
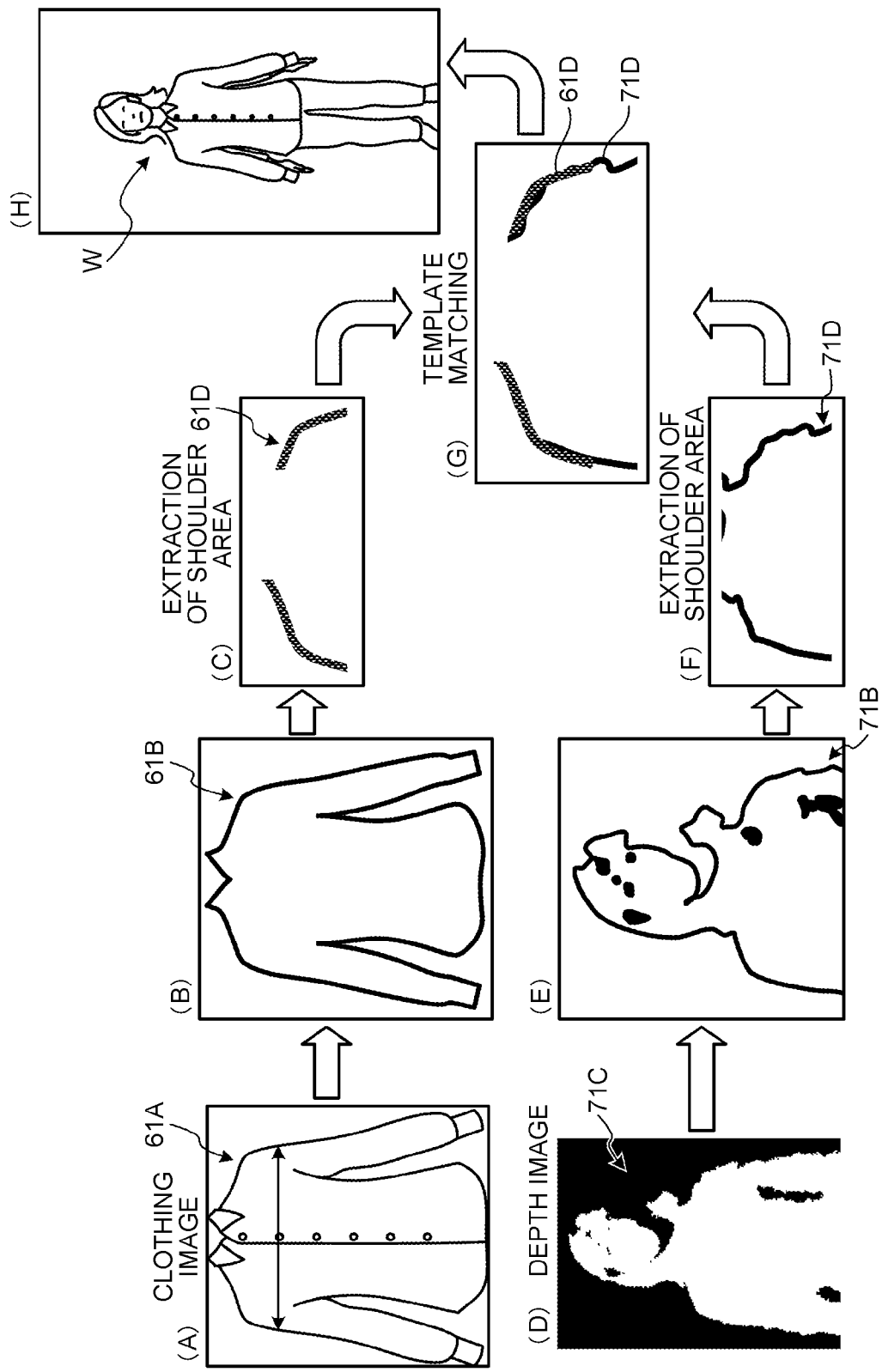
FIG. 14 is an explanatory diagram that schematically illustrates the generation of a synthetic image according to the first embodiment.

FIG. 14 is an explanatory diagram that schematically illustrates the generation of a synthetic image in the image processing device 12 according to the first embodiment.

For example, assume that the clothing image 61A (see (A) in FIG. 14) is to be superimposed. Moreover, assume that the depth image 71C (see (D) in FIG. 14) serves as the depth image of the photographic subject.

In this case, as a result of the adjustment operation performed by the adjusting unit 30, the image outline 61B of the clothing image 61A is extracted (see (B) in FIG. 14). Moreover, as a result of the adjustment operation performed by the adjusting unit 30, a shoulder area 61D is extracted as the feature area (see (C) in FIG. 14).

In an identical manner, as a result of the adjustment operation performed by the adjusting unit 30, an image outline 71B of the depth image 71C of the photographic subject is extracted (see (E) in FIG. 14). Moreover, as a result of the adjustment operation performed by the adjusting unit 30, a shoulder area 71D is extracted as the feature area (see (F) in FIG. 14).

If the determining unit 28 determines that the photographic subject image satisfies the first condition, then the first calculating unit 34 performs template matching (see (G) in FIG. 14) with the use of the shoulder area 61D in the clothing image 61A and the shoulder area 71D in the depth image 71C of the photographic subject, and calculates the first position (not illustrated in FIG. 14). Moreover, if the determining unit 28 determines that the photographic subject image satisfies the first condition, then the deciding unit 38 decides on the first position as the superimposition position.

Then, the generating unit 40 generates the synthetic image W (see (H) in FIG. 14) by superimposing the clothing image to be superimposed, which has been obtained during the adjustment operation performed at Step S106 and which has been enlarged or reduced according to the photographic subject image, at the superimposition position in the color image of the photographic subject obtained by the first obtaining unit 22.

As described above, in the image processing device 12 according to the first embodiment, if the determining unit 28 determines that a photographic subject image obtained by the first obtaining unit 22 satisfies the first condition, then the first position calculated by the first calculating unit 34 is decided to be the superimposition position in the photographic subject image at which the clothing image is to be superimposed. Then, the generating unit 40 generates a synthetic image by superimposing the clothing image to be superimposed, which has been obtained during the adjustment operation performed at Step S106 and which has been enlarged or reduced according to the photographic subject image, at the superimposition position in the color image of the photographic subject obtained by the first obtaining unit 22.

On the other hand, in the image processing device 12, if the determining unit 28 determines that the photographic subject image that is currently obtained by the first obtaining unit 22 does not satisfy the first condition, then the superimposition position is decided on the basis of the difference between the first position calculated from a first photographic subject image, which is the photographic subject image obtained previous to the currently-obtained photographic subject image, and the second position calculated by the second calculating unit 36 from the first photographic subject image.

Herein, the first condition points to a condition for determining whether or not the first position is to be calculated by the first calculating unit 34. Then, the generating unit 40 generates a synthetic image by superimposing the clothing image to be superimposed, which has been obtained during the adjustment operation performed at Step S106 and which has been enlarged or reduced according to the photographic subject image, at the superimposition position in the photographic subject image obtained by the first obtaining unit 22.

In this way, in the image processing device 12 according to the first embodiment, from among the photographic subject images that are obtained, only those photographic subject images which are determined to satisfy the first condition are taken into account for the first position-calculation operation performed by the first calculating unit 34. Then, the deciding unit 38 decides on the first position as the superimposition position. On the other hand, a photographic subject image that is determined not to satisfy the first condition is not taken into account for the first position-calculation operation performed by the first calculating unit 34. Regarding such a photographic subject image, the superimposition position is decided on the basis of the difference between the first position that is calculated previously by the first calculating unit 34 and the second position that is calculated by the second calculating unit 36 from the photographic subject image used in calculating the previous first position (i.e., from the first photographic subject image).

Therefore, in the image processing device 12 according to the first embodiment, it becomes possible to provide a synthetic image at a low processing load while achieving accuracy improvement at the same time.

In the image processing device 12 according to the first embodiment, the explanation is given for a case in which the adjusting unit 30 performs the adjustment operation if the determining unit 28 determines that a photographic subject image obtained by the first obtaining unit 22 satisfies the first condition. Alternatively, the adjusting unit 30 can perform the adjustment operation irrespective of whether or not the photographic subject image obtained by the first obtaining unit 22 satisfies the first condition. However, although the adjustment operation performed by the adjusting unit 30 has a lower processing load as compared to the processing load of the first calculating unit 34, it has a higher processing load as compared to the processing load of the second calculating unit 36. For that reason, as is the case in the first embodiment, it is desirable that the adjustment operation is performed by the adjusting unit 30 only if the determining unit 28 determines that a photographic subject image obtained by the first obtaining unit 22 satisfies the first condition.

Meanwhile, in the first embodiment, regarding the feature area that is extracted, the adjusting unit 30 can also perform a weighting operation according to the posture information of the photographic subject. In that case, the first calculating unit 34 performs template matching with the use of the feature area that has been subjected to the weighting operation.

More particularly, at the time of extracting the feature area from the image outline of the depth image of the photographic subject, the adjusting unit 30 extracts the image outline of the shoulder area in such a way that closer the position of an area to the imaging unit 14 at the time of capturing the photographic subject image, higher becomes the brightness value of the corresponding image outline.

For example, if the photographic subject has a left-leaning posture with respect to the imaging unit 14, then the photographic subject image is captured in which the left shoulder of the photographic subject is closer to the imaging unit 14 as compared to the right shoulder. For that reason, when the posture information of the photographic subject image indicates that the photographic subject has changed the posture from the frontal posture with respect to the imaging unit 14 to the left-leaning posture with respect to the imaging unit 14; the adjusting unit 30 performs the weighting operation in such a way that, in the extracted image outline of the depth image of the photographic subject image, the image outline of the area corresponding to the left shoulder has a higher brightness value as compared to the image outline of the area corresponding to the right shoulder.

Meanwhile, the adjusting unit 30 performs the weighting operation by multiplying a predetermined constant number to the pixel values of the pixels at the target pixel positions for weighting. Moreover, the adjusting unit 30 can obtain, from the depth image, the pixels at the pixel positions closer to the imaging unit 14; and perform the weighting operation in which closer the pixel position to the imaging unit 14, greater is the constant number multiplied to the pixel value of the corresponding pixel.

In an identical manner, at the time of extracting the feature area from the image outline of a clothing image to be superimposed, the adjusting unit 30 extracts the image outline of the shoulder area in such a way that closer the position of an area to the imaging unit 14 at the time of capturing that clothing image, higher becomes the brightness value of the corresponding image outline.

As a result of performing the weighting operation in this manner; during the template matching operation performed by the first calculating unit 34, the first position can be calculated in such a way that closer the area to the imaging unit 14, higher is the accuracy thereof. As a result, it becomes possible to achieve further accuracy improvement.

Figure 15:
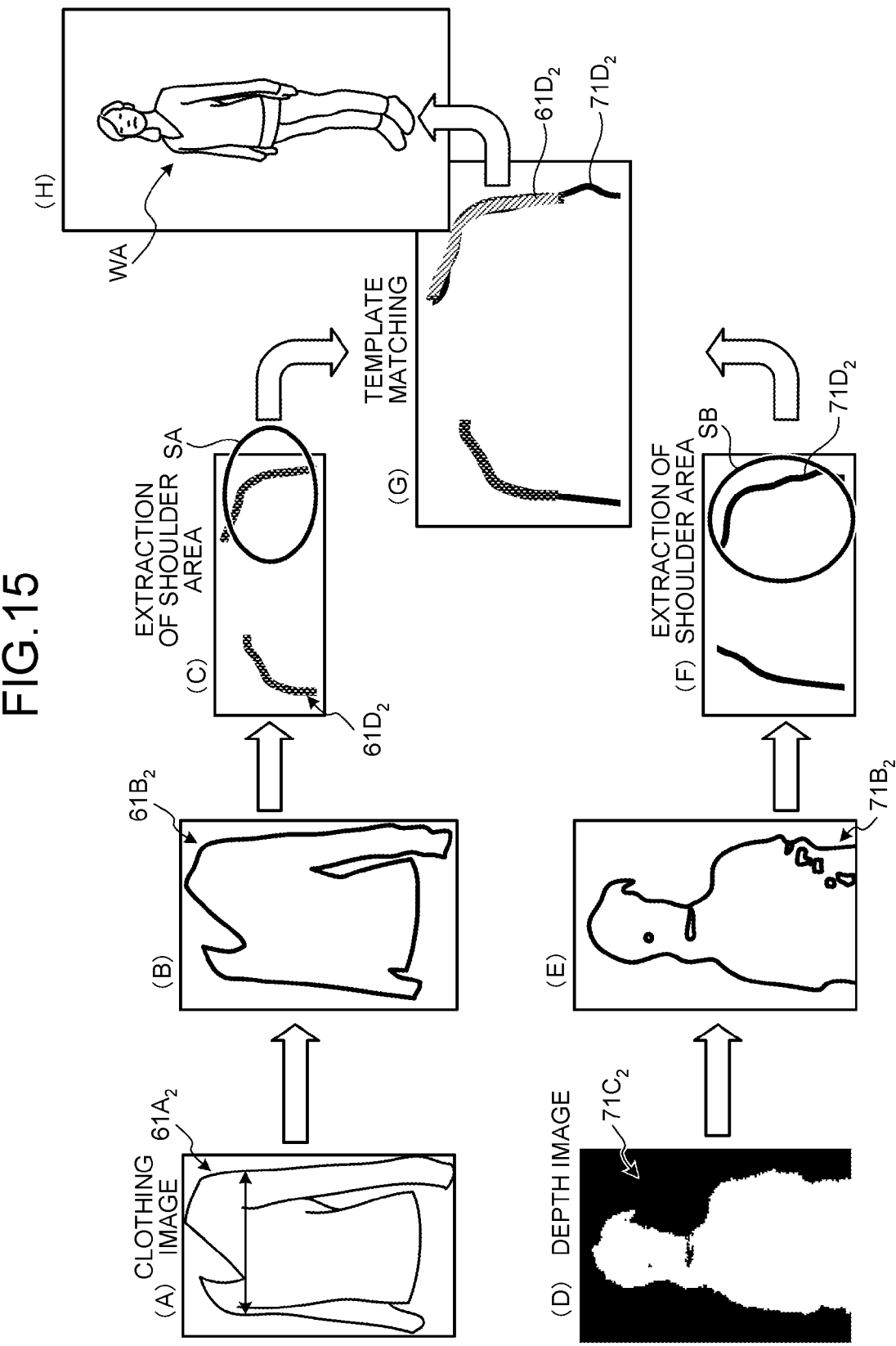
FIG. 15 is an explanatory diagram that schematically illustrates the generation of a synthetic image according to the first embodiment.

FIG. 15 is an explanatory diagram that schematically illustrates the generation of a synthetic image in the case when the adjusting unit 30 performs the weighting operation.

For example, assume that a clothing image $61A_2$ (see (A) in FIG. 15) is to be superimposed. Moreover, assume that a depth image $71C_2$ (see (D) in FIG. 15) serves as the depth image of the photographic subject. Thus, herein, it is assumed that the photographic subject has a left-leaning posture in which the left shoulder of the photographic subject is closer to the imaging unit 14 (not illustrated in FIG. 15) as compared to the right shoulder. In this case, as described above, in the image processing device 12, a clothing image corresponding to the left-leaning posture is read from the memory unit 18.

In this case, as a result of the adjustment operation performed by the adjusting unit 30, an image outline $61B_2$ of the clothing image $61A_2$ is extracted (see (B) in FIG. 15). Moreover, as a result of the adjustment operation performed by the adjusting unit 30, a shoulder area $61D_2$ is extracted as the feature area (see (C) in FIG. 15). At that time, the adjusting unit 30 extracts the shoulder area $61D_2$ after performing the weighting operation with respect to an area SA corresponding to the left shoulder. For that reason, as illustrated in (C) in FIG. 15, the image outline of the shoulder area $61D_2$ is subjected to the weighted operation weighted so as to ensure that the area SA corresponding to the left shoulder of a human body has a higher brightness value.

In an identical manner, as a result of the adjustment operation performed by the adjusting unit 30, an image outline $71B_2$ is extracted from the depth image $71C_2$ of the photographic image (see (E) in FIG. 15). Moreover, as a result of the adjustment operation performed by the adjusting unit 30, a shoulder area $71D_2$ is extracted as the feature area (see (C) in FIG. 15). At that time, the adjusting unit 30 extracts the shoulder area $71D_2$ after performing the weighting operation with respect to an area SB corresponding to the left shoulder. For that reason, as illustrated in (F) in FIG. 15, the shoulder area $71D_2$ has the image outline which is corrected so as to ensure that the area SB corresponding to the left shoulder of a human body has a higher brightness value.

If the determining unit 28 determines that the photographic subject image satisfies the first condition, then the first calculating unit 34 performs template matching (see (G) in FIG. 15) with the use of the shoulder area $61D_2$ in the clothing image 61A and the shoulder area $71D_2$ in the depth image 71C of the photographic subject, and calculates the first position (not illustrated in FIG. 15).

At that time, the shoulder area $61D_2$ in the clothing image 61A and the shoulder area $71D_2$ in the depth image 71C of the photographic subject are the image outlines that are subjected to the weighting operation so as to ensure that the area corresponding to the left shoulder, which is closer to the imaging unit 14, has a higher brightness value. With that, the first calculating unit 34 can perform template matching in such a way that the area corresponding to the left shoulder can be searched with accuracy.

When the determining unit 28 determines that the photographic subject image satisfies the first condition, the deciding unit 38 decides on the first position as the superimposition position.

Then, the generating unit 40 generates a synthetic image WA (see (H) in FIG. 15) by superimposing the clothing image to be superimposed, which has been obtained during the adjustment operation performed at Step S106 and which has been enlarged or reduced according to the photographic subject image, at the superimposition position in the color image of the photographic subject obtained by the first obtaining unit 22.

In this way, as a result of the weighting operation performed by the adjusting unit 30, it becomes possible to achieve further accuracy improvement.

Meanwhile, in the first embodiment, the explanation is given for a case in which the shoulder area is considered to be the feature area. That is because, as an example of the clothing image to be superimposed, a clothing image is considered in which clothing to be tried on the upper body of a human being is captured.

However, as described above, as long as the feature area enables estimation of the shape of the photographic subject on which the clothing is to be tried on, the feature area is not limited to the shoulder area.

Moreover, the feature area can also be set according to the posture of the photographic subject captured in the photographic subject image that is obtained in the image processing device 12.

For example, if a photographic subject image is captured in which the photographic subject is completely sideways with respect to the imaging unit 14, then it is difficult to extract the image outline covering both shoulders of the photographic subject. Consequently, it sometimes becomes difficult to use the shoulder area as the feature area.

In that regard, in the image processing device 12, it is possible to store the following information in advance in the memory unit 18 in a corresponding manner: the posture information (containing the orientation) of the photographic subject captured in the photographic subject image; the feature area corresponding to the posture information; and the feature point according to the feature area. In that case, in the feature area corresponding to the posture information, an area can be set in advance that enables estimation of the shape of the photographic subject from the posture of the photographic subject indicated by the posture information. For example, in the posture information indicating that the photographic subject is completely sideways with respect to the imaging unit 14, the waist area or the neck area is set in advance as the feature area. Moreover, as described above, the feature point can be set in advance according to the feature area.

Then, the adjusting unit 30 calculates the orientation of the photographic subject from the photographic subject image obtained by the first obtaining unit 22 and reads, from the memory unit 18, the feature area and the feature point corresponding to the posture information of the orientation of the photographic subject. Subsequently, the adjusting unit 30 performs the adjustment operation with the use of the feature area that is read. Moreover, the adjusting unit 30 outputs that feature area to the first calculating unit 34, and outputs the feature point to the second calculating unit 36. Then, the first calculating unit 34 and the second calculating unit 36 can perform the respective calculation operations using the feature area and the feature point, respectively, received from the adjusting unit 30.

In the first embodiment, the explanation is given for a case in which the depth image of the photographic subject obtained by the first imaging unit 14A is converted to have the coordinate system of the second imaging unit 14B and then a synthetic image is generated by superimposing a clothing image at the superimposition position in the color image of the photographic subject obtained by the second imaging unit 14B.

However, alternatively, in the image processing device 12, image processing can be performed using a clothing image that contains a depth image of clothing captured by the first imaging unit 14A and a color image of clothing captured by the second imaging unit 14B. In that case, after the depth image of clothing and the color image of clothing are aligned in the coordinate system of the first imaging unit 14A, the superimposition position of the clothing image is converted from the coordinate system of the first imaging unit 14A into the coordinate system of the second imaging unit 14B.

During this operation, even if the first imaging unit 14A has a different position at the time of capturing the clothing than the position of the first imaging unit 14A at the time of capturing the photographic subject, it is possible to perform coordinate conversion using a known technique.

Second Embodiment

Figure 16:
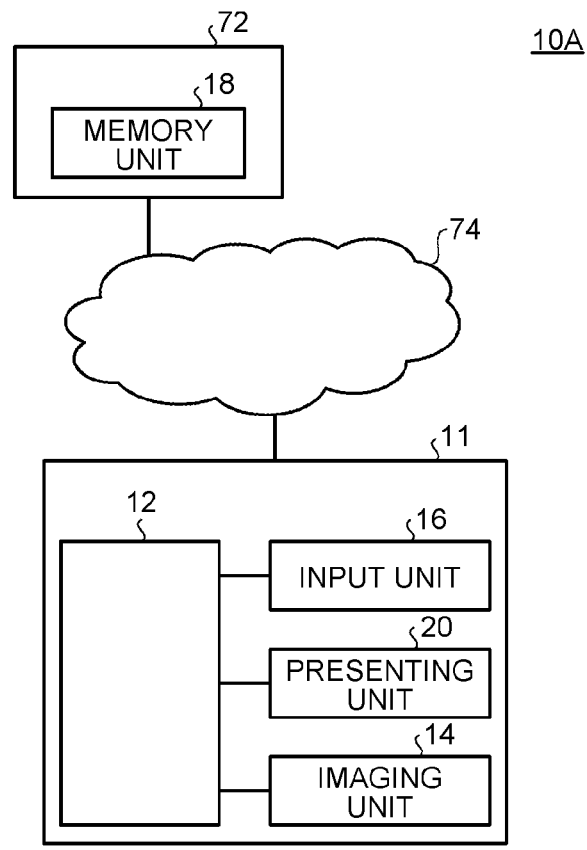
FIG. 16 is schematic diagram illustrating an image processing system according to a second embodiment.

FIG. 16 is schematic diagram illustrating an image processing system 10A.

In the image processing system 10A, a memory device 72 and a processing device 11 are connected via a communication line 74.

The memory device 72 is a publicly known personal computer that includes the memory unit 18 according to the first embodiment. The processing device 11 includes the image processing device 12, the imaging unit 14, the input unit 16, and the presenting unit 20 according to the first embodiment. Herein, the constituent elements identical to those according to the first embodiment are referred to by the same reference numerals, and the explanation thereof is not repeated. The communication line 74 points to the Internet or the like as a wire communication line or a wireless communication line.

As illustrated in FIG. 16, with the configuration in which the memory unit 18 is disposed in the memory device 72 that is connected to the processing device 11 (the image processing device 12) via the communication line 74, it becomes possible to access the same memory unit 18 from a plurality of processing devices 11 (a plurality of image processing devices 12). Moreover, it becomes possible to perform uniform management of the data stored in the memory unit 18.

The processing device 11 can be installed at any arbitrary location. For example, the processing device 11 can be installed at a place, such as a shop, at which the user can view the synthetic images. Moreover, the functions of the processing device 11 can also be provided in a publicly known handheld device.

Third Embodiment

Figure 17:
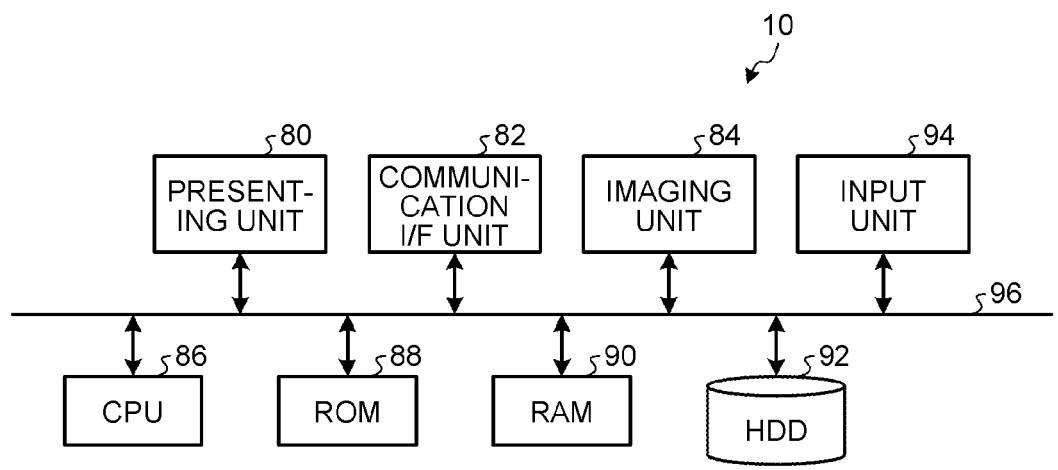
FIG. 17 is a block diagram illustrating an exemplary hardware configuration of an image processing device according to the first and second embodiments.

Given below is the explanation of a hardware configuration of the image processing device 12 according to the first and second embodiments. FIG. 17 is a block diagram illustrating an exemplary hardware configuration of the image processing device 12 according to the first and second embodiments.

The image processing device 12 according to the first and second embodiments has the hardware configuration of a commonly used computer in which a presenting unit 80, a communication I/F unit 82, an imaging unit 84, an input unit 94, a CPU 86, a ROM 88, a RAM 90, and a hard disk drive (HDD) 92 are mutually connected by a bus 96.

The CPU 86 is a processor that controls the overall operations of the image processing device 12. The RAM 90 is used to store data that is required during various operations performed by the CPU 86. The ROM 88 is used to store computer programs that implement various operations performed by the CPU 86. The HDD 92 is used to store data that is stored in the memory unit 18. The communication I/F unit 82 is connected to an external device or an external terminal via a communication line and functions as an interface for sending data to and receiving data from the external device or the external terminal. The presenting unit 80 corresponds to the presenting unit 20 described above. The imaging unit 84 corresponds to the imaging unit 14 described above. The input unit 94 corresponds to the input unit 16 described above.

The computer programs used for implementing the various operations in the image processing device 12 according to the first and second embodiments are stored in advance in the ROM 88.

Alternatively, the computer programs used for implementing the various operations in the image processing device 12 according to the first and second embodiments can be recorded in the form of installable or executable files in a computer-readable recording medium such as a compact disk read only memory (CD-ROM), a flexible disk (FD), a compact disk readable (CD-R), or a digital versatile disk (DVD).

Still alternatively, the computer programs used for implementing the various operations in the image processing device 12 according to the first and second embodiments can be saved as downloadable files on a computer connected to the Internet or can be made available for distribution through a network such as the Internet.

Meanwhile, the computer programs used for implementing the various operations in the image processing device 12 according to the first and second embodiments are run such that each of the abovementioned constituent elements is generated in a main memory device.

The variety of information stored in the HDD 92, that is, the variety of information stored in the memory unit 18 can also be stored in an external device (such as a server). In that case, the configuration can be such that the external device and the CPU 86 are connected via a network or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method comprising:
    calculating a first position of a clothing image in a first photographic subject image based on the clothing image and the first photographic subject image in which a photographic subject is captured;
    calculating a second position of the clothing image in the first photographic subject image based on the first photographic subject image and the clothing image;
    calculating a third position of the clothing image in a second photographic subject image based on the clothing image and the second photographic subject image in which the photographic subject is captured after the first photographic subject image; and
    determining, using the first, second and third positions, a superimposition position of the clothing image with respect to the second photographic subject image,
    wherein
    the first position is calculated using a first method, and the second and third positions are calculated using a second method different from the first method.

2. The method according to claim 1, further comprising:
    generating a synthesized image by superimposing the clothing image at the superimposition position in the second photographic subject image.

3. The method according to claim 1, wherein
    the first method comprises calculating the first position in such a way that a position of a feature area, which enables estimation of a shape of the photographic subject captured in the first photographic subject image, matches with a position of the feature area in the clothing image; and
    the second method comprises calculating the second position or the third position in such a way that a position of a feature point, which is set in advance according to the feature area in the first photographic subject image or the second photographic subject image, matches with a position of the feature point in the clothing image.

4. The method according to claim 1, wherein
    the first method comprises calculating, as the first position, a center of a shoulder area that is the feature area in the first photographic subject image.

5. An image processing device comprising:
    a memory; and
    a hardware processor configured to at least:
        by using:
            a first position of a clothing image in a first photographic subject image, the first position being calculated on the basis of the clothing image and the first photographic subject image in which a photographic subject is captured,
            a second position of the clothing image in the first photographic subject image, the second position being calculated on the basis of the first photographic subject image and the clothing image, and
            a third position of the clothing image in a second photographic subject image, the third position being calculated on the basis of the clothing image and the second photographic subject image being an image in which the photographic subject is captured after the first photographic subject image,
        determine a superimposition position of the clothing image with respect to the second photographic subject image, wherein
    the first position is calculated using a first method, and the second and third positions are calculated using a second method different from the first method.

6. The device according to claim 5, wherein the hardware processor is further configured to generate a synthesized image by superimposing the clothing image at the superimposition position in the second photographic subject image.

7. The device according to claim 5, wherein
the first method comprises calculating the first position in such a way that a position of a feature area, which enables estimation of a shape of the photographic subject captured in the first photographic subject image, matches with a position of the feature area in the clothing image; and
the second method comprises calculating the second position or the third position in such a way that a position of a feature point, which is set in advance according to the feature area in the first photographic subject image or the second photographic subject image, matches with a position of the feature point in the clothing image.

8. The device according to claim 5, wherein
the first method comprises calculating, as the first position, a center of a shoulder area that is the feature area in the first photographic subject image.

9. An image processing device comprising:
a memory; and
a hardware processor configured to at least:
determine a superimposition position of a clothing image with respect to a second photographic subject image, wherein
the hardware processor is configured to, based on a first condition, switch between determining the superimposition position of the clothing image using a first position, a second position, and a third position and determining the superimposition position of the clothing image using a fourth position calculated from the second photographic subject image using a first method,
the first position is a position of the clothing image in a first photographic subject image, the first position being calculated based on the clothing image and the first photographic subject image in which a photographic subject is captured,
the second position is a position of the clothing image in the first photographic subject image, the second position being calculated based on the first photographic subject image and the clothing image,
the third position is a position of the clothing image in the second photographic subject image, the third position being calculated based on the clothing image and the second photographic subject image in which the photographic subject is captured after the first photographic subject image,
the first position is a position calculated using the first method, and the second and third positions are respective positions calculated using a second method different from the first method.

10. The device according to claim 9, wherein the hardware processor is configured to, when the second photographic subject image is determined to satisfy the first condition, determine the fourth position as the superimposition position in the second photographic subject image at which the clothing image is to be superimposed, and configured to, when the second photographic subject image is determined not to satisfy the first condition, determine the superimposition position based on a difference between the first position and the second position, and the third position.

11. The device according to claim 10, wherein the hardware processor is configured to, when the second photographic subject image is determined not to satisfy the first condition, shift the third position by an amount equivalent to the difference and determine the shifted third position as the superimposition position.

12. The device according to claim 9, wherein
the second method comprises calculating, as the second position or the third position, a center of a shoulder area in the clothing image.

13. The device according to claim 9, wherein the first condition includes one or more conditions in which
there is a change in the photographic subject;
after the change, stillness of the photographic subject is detected;
a new clothing image is obtained;
after elapsing of a certain amount of time following a previous target photographic subject image for a first position calculation or a fourth position calculation, the photographic subject image is obtained;
posture information of the clothing image is matched with posture information of the photographic subject;
an amount of movement of the photographic subject is equal to or smaller than a predetermined amount; and
a human, as the photographic subject, lowers an arm.

14. The device according to claim 9, wherein
the first method comprises calculating, as the first position or the fourth position, a position at which an area corresponding to a shoulder of a human body in the clothing image most matches with an area corresponding to a shoulder of a human body in the photographic subject image.

15. An image processing method comprising:
determining a superimposition position of a clothing image with respect to a second photographic subject image,
based on a first condition, switching between determining the superimposition position of the clothing image using a first position, a second position, and a third position and determining the superimposition position of the clothing image using a fourth position calculated from the second photographic subject image using a first method, wherein
the first position, which is a position of the clothing image in a first photographic subject image, is calculated based on the clothing image and the first photographic subject image in which a photographic subject is captured;
the second position, which is a position of the clothing image in the first photographic subject image, is calculated based on the first photographic subject image and the clothing image;
the third position, which is a position of the clothing image in the second photographic subject image, is calculated based on the clothing image and the second photographic subject image in which the photographic subject is captured after the first photographic subject image,
wherein the first position is calculated using the first method, and the second and third positions are calculated using a second method different from the first method.

16. The method according to claim 15, further comprising:
when the second photographic subject image is determined to satisfy the first condition, determining the fourth position as the superimposition position in the second photographic subject image at which the clothing image is to be superimposed, and when the second photographic subject image is determined not to satisfy the first condition, determining the superimposition position on the basis of a difference between the first position and the second position, and the third position.

17. The method according to claim 16, further comprising:

when the second photographic subject image is determined not to satisfy the first condition, shifting the third position by an amount equivalent to the difference and determining the shifted third position as the superimposition position.

18. The method according to claim 15, wherein the second method comprises calculating, as the second position or the third position, a center of a shoulder area in the clothing image.

19. The method according to claim 15, wherein the first condition includes one or more conditions in which there is a change in the photographic subject;

after the change, stillness of the photographic subject is detected;

a new clothing image is obtained;

after elapsing of a certain amount of time following a previous target photographic subject image for a first position calculation or a fourth position calculation, the photographic subject image is obtained;

posture information of the clothing image is matched with posture information of the photographic subject;

an amount of movement of the photographic subject is equal to or smaller than a predetermined amount; and a human, as the photographic subject, lowers an arm.

20. The method according to claim 15, wherein the first method comprises calculating, as the first position or the fourth position, a position at which an area corresponding to a shoulder of a human body in the clothing image most matches with an area corresponding to a shoulder of a human body in the photographic subject image.

* * * * *